(12) United States Patent
Stoschek et al.

(10) Patent No.: US 9,329,597 B2
(45) Date of Patent: May 3, 2016

(54) AUTONOMOUS DATA MACHINES AND SYSTEMS

(71) Applicant: Knightscope, Inc., Mountain View, CA (US)

(72) Inventors: Arne Stoschek, Palo Alto, CA (US); William Santana Li, Mountain View, CA (US); Stacy Dean Stephens, McKinney, TX (US); Mercedes Soria-Li, Mountain View, CA (US); Aaron J. Lehnhardt, Mission Viejo, CA (US); Dominic A. Villa, Sunnyvale, CA (US); Phillip Wong, San Francisco, CA (US)

(73) Assignee: KNIGHTSCOPE, INC., Mountain View, CA (US)

( * ) Notice: Subject to any disclaimer, the term of this patent is extended or adjusted under 35 U.S.C. 154(b) by 0 days.

(21) Appl. No.: 14/599,073

(22) Filed: Jan. 16, 2015

(65) Prior Publication Data
US 2015/0205298 A1 Jul. 23, 2015

Related U.S. Application Data

(60) Provisional application No. 61/929,007, filed on Jan. 17, 2014.

(51) Int. Cl.
| | |
|---|---|
| *G01C 22/00* | (2006.01) |
| *G05D 1/02* | (2006.01) |
| *G08B 13/00* | (2006.01) |
| *G08B 25/10* | (2006.01) |

(52) U.S. Cl.
CPC .............. *G05D 1/021* (2013.01); *G08B 13/00* (2013.01); *G08B 25/10* (2013.01); *Y10S 901/01* (2013.01)

(58) Field of Classification Search
USPC .......................................................... 701/23
See application file for complete search history.

(56) References Cited

U.S. PATENT DOCUMENTS

| | | | |
|---|---|---|---|
| 5,446,445 A | 8/1995 | Bloomfield et al. | |
| 6,343,242 B1 * | 1/2002 | Nomura ................ | B25J 9/1676 318/568.11 |
| 6,374,155 B1 | 4/2002 | Wallach et al. | |
| 6,429,617 B1 * | 8/2002 | Sano ...................... | B25J 9/1666 318/560 |
| 7,030,757 B2 | 4/2006 | Matsuhira et al. | |
| 8,111,156 B2 | 2/2012 | Song et al. | |
| 8,473,143 B2 | 6/2013 | Stark et al. | |
| 8,744,626 B2 | 6/2014 | Johnson et al. | |

(Continued)

OTHER PUBLICATIONS

U.S. Appl. No. 14/751,115, filed Jun. 25, 2015.

(Continued)

*Primary Examiner* — Hussein A. Elchanti
(74) *Attorney, Agent, or Firm* — Wilson Sonsini Goodrich & Rosati

(57) ABSTRACT

Autonomous data machines and systems may be provided, which may be deployed in an environment. The machines may roam within the environment and collect data with aid of one or more sensors. The data may be sent to a control center, which may optionally receive information from additional data sources, such as other on-site sensors, existing static data, or real-time social data. The control center may send instructions to the machines to perform one or more reaction based on the received information. The autonomous data machines may be capable of reacting autonomously to one or more detected condition. In some instances, the autonomous data machines may be employed for security or surveillance.

10 Claims, 15 Drawing Sheets

(56) References Cited

U.S. PATENT DOCUMENTS

| | | | | |
|---|---|---|---|---|
| 2003/0229474 | A1* | 12/2003 | Suzuki | G08B 25/009 702/188 |
| 2004/0095149 | A1* | 5/2004 | Chen | G01D 3/08 324/660 |
| 2006/0206289 | A1* | 9/2006 | Stake | G05B 19/4183 702/184 |
| 2009/0143913 | A1* | 6/2009 | Kim | B25J 9/1674 700/259 |
| 2011/0010010 | A1* | 1/2011 | Kai | B25J 19/063 700/255 |

OTHER PUBLICATIONS

U.S. Appl. No. 14/751,124, filed Jun. 25, 2015.
U.S. Appl. No. 14/836,857, filed Aug. 26, 2015.
U.S. Appl. No. 14/599,344, filed Jan. 16, 2015.

* cited by examiner

AUTONOMOUS DATA MACHINES AND SYSTEMS

CROSS-REFERENCE

This application claims the benefit of U.S. Provisional Application No. 61/929,007, filed Jan. 17, 2014, which application is incorporated herein by reference.

BACKGROUND OF THE INVENTION

Crime is a significant problem that has a large detrimental effect, both personally and economically. For instance, crime has a $1+ trillion negative economic impact on the United States economy. Violent crime and property crime occur with high frequency. The security market uses security guards, law enforcement personnel, and law enforcement vehicles to aid in combating crime. Existing security systems, however, may be costly to implement, due to the large number of security personnel needed for effective surveillance. Furthermore, crime still remains a very significant problem with a great deal of associated cost.

SUMMARY OF THE INVENTION

A need exists for improved systems, methods, and devices for combating crime. The present invention provides systems, methods, and devices that may assist with predicting and preventing crime. Autonomous data machines and systems can be used for surveillance and security purposes, and thereby reduce the negative personal and economic impact of crime. Autonomous data machines may be provided in a large-scale deployment of autonomous technology, sensors, robotics, big data, and predictive analytics, may gather real-time on-site data and combine it with existing large data sets as well as relevant geo-fenced social network feeds, to allow for an ability to provide predictive mapping in a given environment. These self-driving robots may help society build safer, engaged communities while significantly reducing costs and crime, and saving lives.

In some implementations, autonomous data machines may freely roam an environment and collect information that can be used to detect or prevent crime. The autonomous data machines may communicate with external systems and devices, and utilize information from other sources, such as a-priori information. Predictive analysis may be used on the data collected by the autonomous data machines and additional data sources. Alerts may be provided based on risk factors and machine learning. The autonomous data machines may also communicate with third parties, such as security systems or individuals. Efficient deployment of resources may be provided on-site based on the analyzed data.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

The invention provides systems and methods for combating crime with the aid of autonomous data machines in accordance with aspects of the invention. Various aspects of the invention described herein may be applied to any of the particular applications set forth below or for any other types of security or surveillance systems. The invention may be applied as a standalone system or method, or as part of an event-driven data collection and reaction system. It shall be understood that different aspects of the invention can be appreciated individually, collectively, or in combination with each other.

Autonomous data machines may be provided in an environment and may perform one or more missions in the environment. For example autonomous data machines may be deployed at a location and used for security or surveillance at the location. Autonomous data machines may be robots that can freely roam the environment at which they are deployed. They may collect information and react in response to the collected information. In some instances, they may communicate some or all of the collected information to the control center. The control center may analyze the data, optionally in conjunction with data from other sources. In some instances, the control center may send information and/or instructions to the autonomous data machine. The autonomous data machine can also interact with humans or other external systems, such as a local security or law enforcement system.

Autonomous Data Machine

An autonomous data system may have multiple technology layers. For example, a robot control layer may be provided, which may assist with control of one or more autonomous data machines in the system. The robot control layer may include autonomous and/or semi-autonomous activity of the autonomous data machines. Functions such as machine learning, propulsion, charging, stopping, turning, sleep, and/or machine-to-machine (M2M) interaction may be included in the robot control layer. A sensor layer may be provided. The sensor layer may be capable of performing audio and/or visual sensing. The sensor layer may be capable of performing optical character recognition, omnidirectional imaging, thermal imaging, sound collection through microphones, ultrasonic sensing, infrared sensing, LIDAR, air quality assessment, weather and other environmental sensing including barometric pressure, temperature, humidity, pollution, smoke, CO2, noise, sensing of radiation, chemical and biological agents or hazards, sensing of electromagnetic radiation, sensing presence and identity of radio, cellular or wireless devices, etc. The system may also include a data analytics and system control layer. This may include a graphical user interface, remote operation, real time review, decision support and/or mission planning. In some implementations, the data analytics may occur on-board a robot, at a control center external to the robot, or any combination thereof.

Figure 1A:
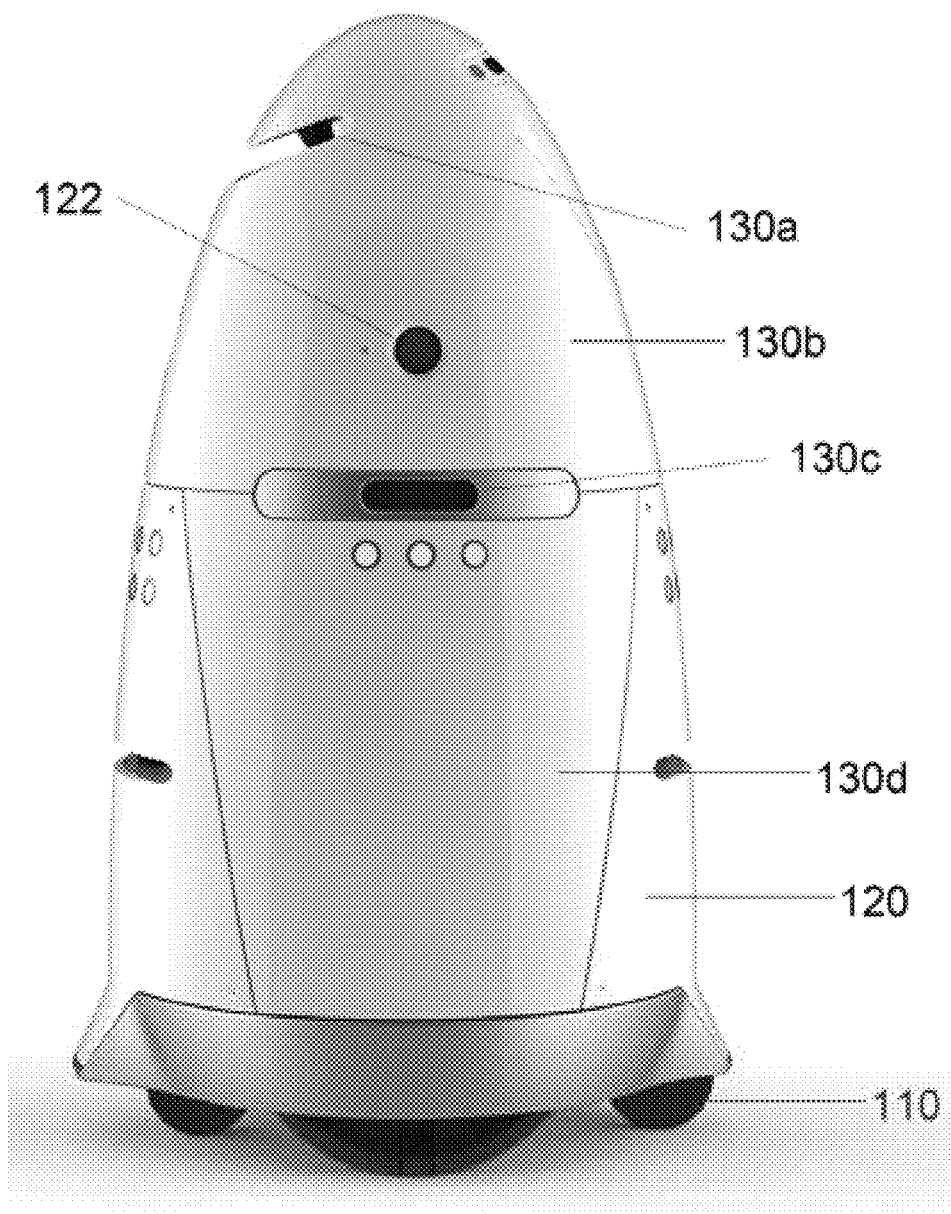
FIG. 1A shows an example of an autonomous data machine in accordance with an embodiment of the invention.

FIG. 1A shows an example of an autonomous data machine in accordance with an embodiment of the invention. The autonomous data machine may be a self-propelled surveillance or data collection robot. The autonomous data machine may have one or more propulsion units 110, a power supply, a housing 120, one or more sensors 130, communication unit, controller, memory, and/or interface unit.

The autonomous data machine may be capable of freely roaming about an environment. The machine may freely move along three dimensions or two dimensions. The machine may freely move over a surface or may be semi-restricted to certain areas or types of surfaces. The data machine may freely roam over gravel, pavement, grass, sand, dirt, carpet, concrete floors, hardwood floors, or any other surface. The autonomous data machine may be able to traverse transitions between different types of surfaces. The autonomous data machines may or may not change propulsion units or methods when transitioning to different surface types. For example, the autonomous data machine may move about with the aid of one or more propulsion unit, which may include wheels 110, rollers, legs, arms, propellers, rotors, or movable body surfaces. The machine may be self-propelled. The machine may be capable of moving on its own without requiring the aid of a human or other live being.

In some embodiments a propulsion unit may include a plurality of wheels that may permit the autonomous data machine to roll over an underlying surface. In some examples, two, three or four wheels may be provided which may permit the autonomous data machine to stand stably while not moving. In some instances, stabilization may occur with aid of one or more wheels or other stabilization platforms, such as gyroscopic platforms. The wheels may vary in size or be the same size. In some cases, the wheels can have a diameter of at least about 1 cm, 2 cm, 3 cm, 4 cm, 5 cm, 8 cm, 9 cm, 10 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 150 cm, or 200 cm. The wheels can have a smooth or treaded surface. The wheels may also permit the autonomous data machine to move laterally and/or rotate in place. The autonomous data machine may be capable of making any combination of translational or rotational movement.

The propulsion unit may be driven with aid of one or more drive units. For example, a motor, engine, drive train, or any other component may be provided that may aid in driving the propulsion of the autonomous data machine. In some instances a drive unit may be proximally located to the propulsion units to drive the propulsion units. Alternatively they may be operably linked without necessarily being adjacent or in close proximity to one another.

One or more power supplies may be used to power the autonomous data machine. A power supply may be an energy storage device, such as one or more batteries. The batteries may be rechargeable batteries (i.e. secondary batteries). Batteries having any battery chemistry known or later developed in the art may be used. In some instances, batteries may be lead acid batteries, valve regulated lead acid batteries (e.g., gel batteries, absorbed glass mat batteries), nickel-cadmium (NiCd) batteries, nickel-zinc (NiZn) batteries, nickel metal hydride (NiMH) batteries, or lithium-ion (Li-ion) batteries. The one or more power supplies may power one or more components of the autonomous data machine. The power supplies may be used to power propulsion of the autonomous data machine, such as a motor that mean effect turning of one or more wheels of the autonomous data machine. The power supplies may power any other components of the autonomous data machine, such as one or more sensors 130, communication unit, controller, memory, and/or display/audio unit. The same power supply may be used for multiple components, or different power supplies may be used for different components. Batteries may also be exchanged or swapped out. A controller of the machine may register state of charge of the batteries and may provide an instruction for the machine to recharge. The machine can autonomously approach and connect to a recharging station based on an instruction from the controller when the state of charge of the battery is below a predetermined threshold. The controller may also detect whether the machine should enter a power savings mode and/or limit communication.

The autonomous data machine may have one or more housing 120. In some embodiments, the housing may be a solid shell that may protect one or more components of the autonomous data machine, such as a sensor payload and robotic platform. The housing may contain one or more components of the autonomous data machine. The housing may completely or partially enclose one or more components of the autonomous data machine. For example, the drive unit may be contained within the housing. One or more components of the autonomous data may be provided external to the housing, attached to an exterior of the housing, or completely or partially embedded in the housing. In some examples, a propulsion unit may be partially or completely exposed outside the housing. For example, wheels may protrude from the bottom of the housing to contact the ground. Optionally, one or more sensors may be partially or completely exposed outside the housing, or may be completely enclosed within the housing.

Figure 1B:
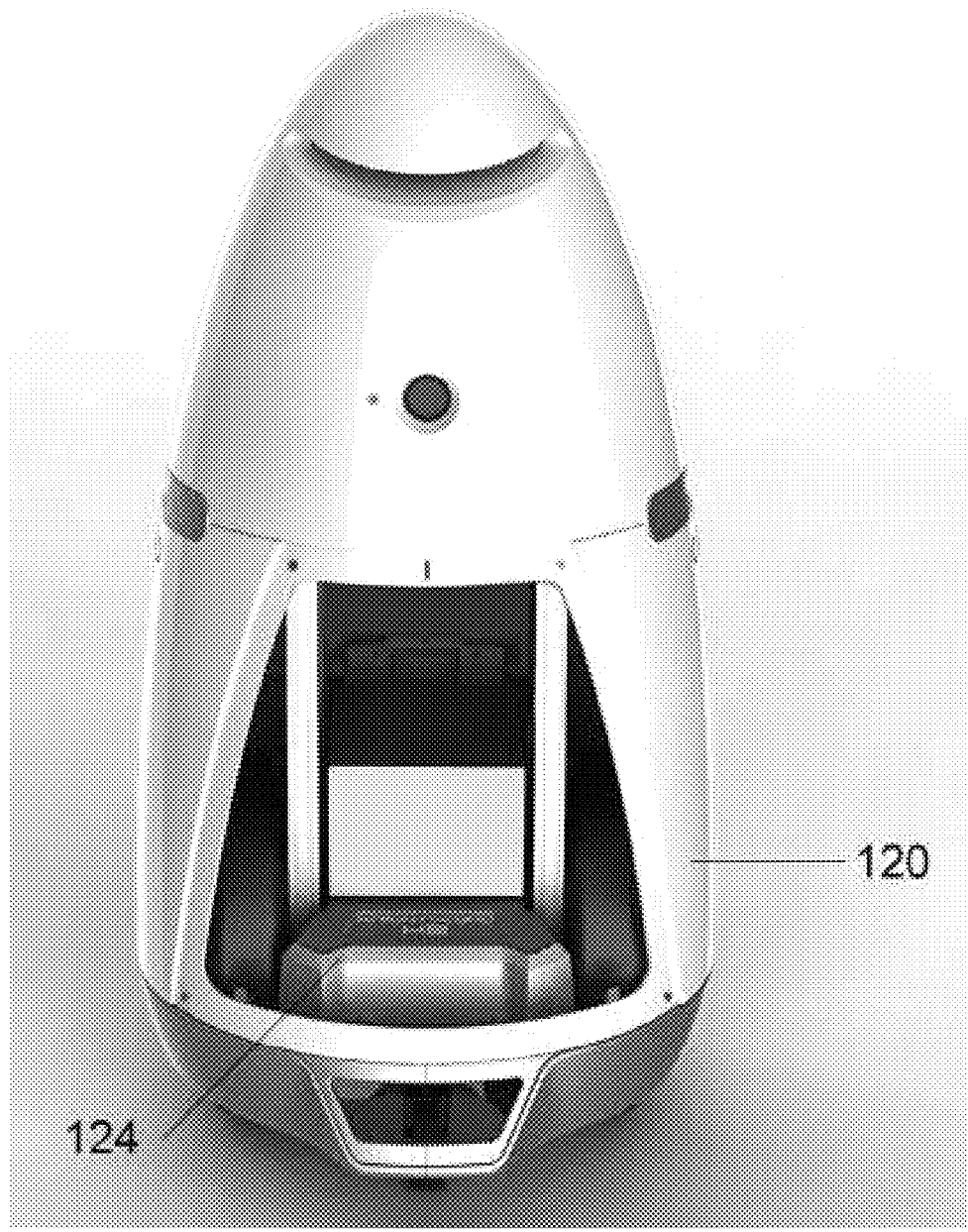
FIG. 1B shows a view of the autonomous data machine where a portion of the housing is opened to expose the interior.

FIG. 1B shows a view of the autonomous data machine where a portion of the housing 120 is opened to expose the interior 124. In some instances, one or more objects or components of the autonomous data machines may be stored in the interior. For example, a sensor payload may be provided therein. Alternatively, other autonomous data machines may be provided. Any sort of instrumentation, propulsion or drive unit, power unit, or other components may be provided therein. One or more panels of the housing may be removable to provide a user with access to the interior. A user may access the interior to perform maintenance or repairs. A user may access the interior to swap out one and/or exchange or more components. A user may access the interior to swap out and/or exchange one or more batteries. In some instances, a user may access any type of payload therein.

Figure 2:
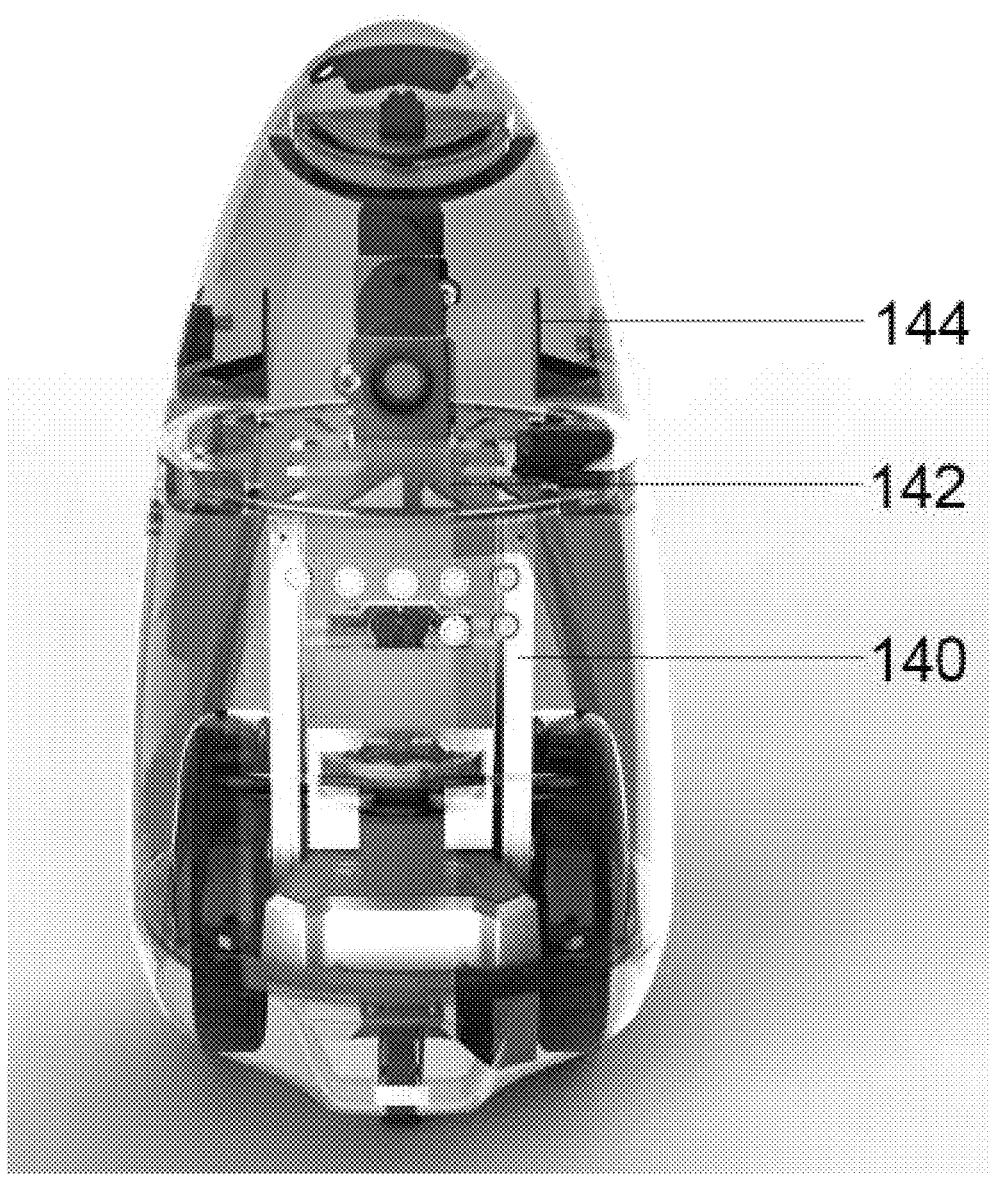
FIG. 2 shows a view of the autonomous data machine with an internal structure.

FIG. 2 shows a view of the autonomous data machine with an internal structure 140. The internal support structure may include one or more support bars or support platforms 142, 144. In some instances, one or more sensors 130 or other components may be supported by the internal structure. For example, one or more sensors may be provided on a support platform of the internal structure. In some embodiments, multiple layers of lateral support platforms may be provided to support multiple layers of sensors or other components.

Figures 4A, 4B:
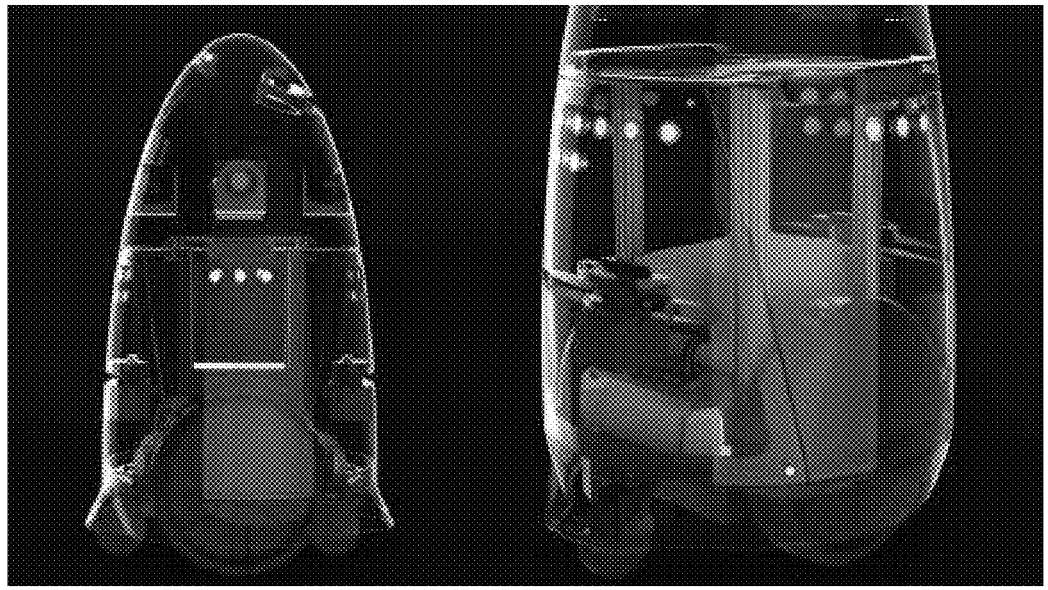
FIG. 4A shows an example of an autonomous data machine with the underlying support structure as seen through the housing.
FIG. 4B shows a close-up view of a lower portion of the autonomous data machine.

FIG. 4A shows an example of an autonomous data machine with the underlying support structure as seen through the housing. The support structure may comprise brackets, plates, and/or rods arranged to provide structural support for one or more components. The support structure can be made from metallic, composite, and/or polymer material. As previously described, various components, such as the propulsion/drive units, power supplies, sensors, communication unit, controller, memory, and/or interface unit may be provided therein. The machine may have a substantially circular cross-section. Sensors may be distributed around the body to provide the machine with omni-directional sensing. The machine's sensing capabilities may be substantially the same from any angle around the machine.

FIG. 4B shows a close-up view of a lower portion of the autonomous data machine. One or more wheels may be used to aid in propelling the autonomous data machine. Underlying support structure may aid in supporting the housing, sensors, and/or other components therein. A controller and/or power supply may be provided, and optionally carried on the support structure.

The autonomous data machine may have any size, shape, or form factor. In some examples, the autonomous data machine may have one or more dimensions (e.g., width, length, height, diagonal, and/or diameter) that may be greater than or equal to about 1 foot, 2 feet, 3 feet, 4 feet, 5 feet, 6 feet, or 7 feet. Optionally, an autonomous data machine may have one or more dimensions (e.g., width, length, height, diagonal, and/or diameter) that may be less than or equal to about 2 feet, 3 feet, 4 feet, 5 feet, 6 feet, 7 feet, or 10 feet. The machine may be taller than it is wide, or vice versa. The autonomous data machine may weigh more than or equal to about 20 pounds, 50 pounds, 100 pounds, 150 pounds, 200 pounds, 250 pounds, 300 pounds, or 350 pounds. Optionally, the autonomous data machine may weigh less than or equal to about 100 pounds, 150 pounds, 200 pounds 250 pounds, 300 pounds, 350 pounds, 400 pounds, or 500 pounds. The size, shape, and/or form factor may be determined by the housing 120 size, shape, and/or form factor. The autonomous data machine may be sized or weighted to be too large or heavy for an individual to easily destroy, pick up, take, tip over, or take other actions. Alternatively, the autonomous data machine may be of a size and/or weight to be lifted or carried by an individual.

The autonomous data machine may be shaped with a curved surface. The housing of the data surface may form a substantially smooth curved surface. The machine may have a round cross-sectional shape. In some instances, the cross-sectional shape may be circular or elliptical. Having a rounded shape with sensors around may permit the machine to sense in 360 degrees around the machine. The machine vision sensors may be able to capture images from all around the machine simultaneously. Regardless of which way the machine is oriented, data such as images may be collected from any angle around the machine. The machine may be substantially bullet shaped with a rounded top. In some instances, the bottom portion of the machine may be heavier than the top portion of the machine. The machine may have a low center of gravity to aid with stability. Optionally, the bottom portion of the machine may have a larger cross-sectional area than the top portion of the machine. The bottom portion of the machine may be wider than the top portion, thereby aiding with stability. In some instances, the sensors may be distributed at any height of the machine. The sensors may be distributed high enough to gain a wide field of view. For instance, image capture sensors may be several feet (e.g., about 2 feet, 3 feet, 4 feet, or 5 feet) above the surface of the ground.

Figure 3:
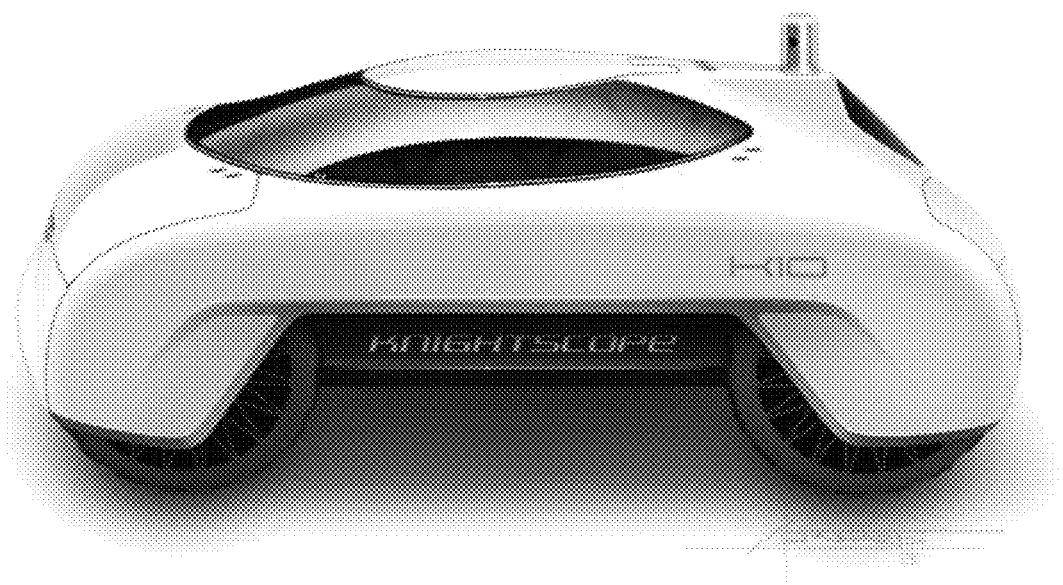
FIG. 3 shows an example of an autonomous data machine having an alternative form factor.

FIG. 3 shows an example of an autonomous data machine having an alternative form factor. In some examples, the autonomous data machines may be an upright small vehicle (e.g., FIG. 1A). The upright small vehicles may use a two-wheel platform with tilt stabilization (which may be gyroscopic or use a third and/or fourth wheel). In some implementations the autonomous data machines may have a large vehicle shape (e.g., FIG. 3). A three-wheel or four-wheel platform may be used. Optionally, skid steering may be used for simplicity. In some alternative implementations, the low-lying vehicle shape may be sized to be a small or large vehicle. A large vehicle implementation may be of comparable size to a vehicle used to carry a human from one location to another.

The autonomous data machine may have one or more sensors 130. Some of the sensors may be data collection sensors that may collect data to be analyzed on-board the autonomous data machine or to be sent to a control center, where it may be analyzed further. Some of the sensors may be navigation sensors, which may assist the autonomous data machine with moving autonomously or semi-autonomously about its environment. Some sensors may function as both data collection sensors and navigation sensors (e.g., data collected from the sensors may be analyzed further in the context of the autonomous data machine's mission—e.g., surveillance, security, etc., and may also be used to assist the autonomous data machine in navigating and interacting with the environment). Some of the sensors may collect data for the machine's mission while some sensors may be reflective of a state of the machine, or both.

Some examples of sensors that may be employed by the autonomous data machine may include remote sensors, such as laser imaging detection and ranging (LIDAR) 130a, radar, sonar; a sensor array 130b; differential global positioning system (DGPS) 130c; inertial measurement unit (IMU)

which may include one or more gyroscopes, magnetometers, or accelerometers; ultrasonic sensors 130d; image sensors (e.g., visible light, infrared), heat sensors, audio sensors, vibration sensors, conductivity sensors, chemical sensors, biological sensors, radiation sensors, conductivity sensors, proximity sensors or any other type of sensors. The sensors may be distributed within the autonomous data machine housing, on the data machine housing, and/or as part of the data machine housing.

The DGPS sensor may be used to assist the autonomous data machine in navigating its environment. Any description herein of a DGPS sensor may apply to any type of GPS sensor. The DGPS sensor can communicate with one or more ground based reference station and/or GPS satellites to obtain one or more GPS data signals. The DGPS system may preferably use a network of fixed, ground-based reference stations to broadcast the difference between the positions indicated by the GPS satellite systems and the known fixed positions. The stations may broadcast the difference between the measured satellite pseudoranges and actual (internally computed) pseudoranges, and receiver stations may correct their pseudoranges by the same amount. The DGPS sensor may be provided exterior to or within a housing of the autonomous data machine. The signals received by the DGPS sensor can be processed to determine the position of the autonomous data machine relative to a global reference frame (e.g., latitude, longitude, and altitude), and thereby determine the translational velocity and/or acceleration of the autonomous data machine. The DGPS sensor can utilize any suitable GPS technology, such as differential GPS (DGPS) or real time kinematic (RTK) GPS. The GPS sensor can be configured to determine the position of the autonomous data machine to any suitable level of accuracy, such as meter-level accuracy (e.g., within 10 m, 5 m, 2 m, or 1 m of accuracy) or centimeter-level accuracy (within 500 cm, 200 cm, 100 cm, 50 cm, 20 cm, 10 cm, or 5 cm of accuracy).

In some instances, an IMU may also aid in the navigation of the autonomous data machine. An IMU can include one or more accelerometers, one or more gyroscopes, one or more magnetometers, or suitable combinations thereof. For example, the IMU can include up to three orthogonal accelerometers to measure linear acceleration of the movable object along up to three axes of translation, and up to three orthogonal gyroscopes to measure the angular acceleration about up to three axes of rotation. The IMU may be provided exterior to or within a housing of the autonomous data machine. The IMU can provide a signal indicative of the motion of the autonomous data machine, such as a position, orientation, velocity, and/or acceleration of the aerial vehicle (e.g., with respect to one, two, or three axes of translation, and/or one, two, or three axes of rotation). For example, the IMU can sense a signal representative of the acceleration of the autonomous data machine, and the signal can be integrated once to provide velocity information, and twice to provide location and/or orientation information. The IMU may provide a signal to a controller of the autonomous data machine.

In some instances, a combination of the GPS and IMU may be used to aid in the navigation and/or movement of the autonomous data machine in its environment. Alternatively, such sensing systems may operate independently and/or for different purposes.

One or more sensors may be provided in a sensor array 130b. The sensor array may include a plurality of different sensors or types of sensors. The sensor array may include data collection sensors that may collect information that may be analyzed in the context of the mission of the autonomous data machine. The sensors in the sensor array may be provided as one or more rows or one or more columns of sensors. The sensors may encircle a support structure, e.g., a rounded support structure, or support structure of any shape. In some instances, the sensor array may be provided on exterior surface of a housing of the autonomous data machine. Alternatively, the sensor array may be provided within a housing of the autonomous data machine. In some instances, a transparent housing 122 or portion of the housing may be provided around the sensor array. The transparent portion of the housing may permit certain sensors to collect information through the housing. For example, images may be captured through a transparent portion of the housing. In another example, a thermal scan may occur through a portion of the housing. The transparent housing may protect the sensor array therein.

Figure 4C:
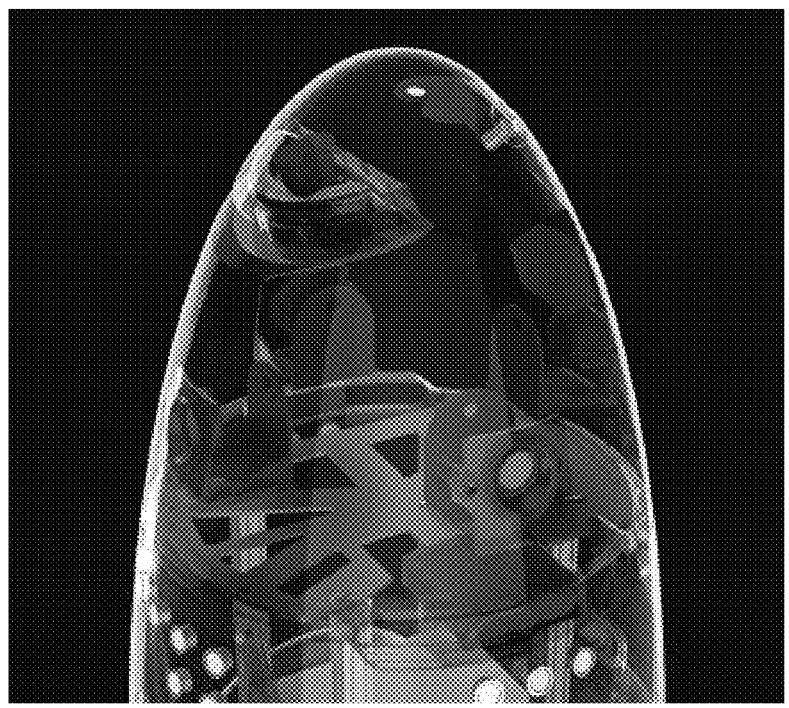
FIG. 4C shows an example of a sensor arrangement in accordance with an embodiment of the invention.

FIG. 4C shows an example of a sensor arrangement in accordance with an embodiment of the invention. The autonomous data machine may be capable of performing multiple functions using multiple 'senses'. The autonomous data machine may be configured to see, hear, feel, and/or smell. The autonomous data machine may be able to provide one or more, two or more, three or more, or all four of these functions.

The autonomous data machine may be able to see using one or more imaging sensors. In some instances, nighttime and daytime 360 degree imaging may be provided. In one example, 360 degree imaging may be provided with aid of multiple image capture devices located around a circular base (e.g., in the sensor array). The image capture devices may be configured to capture static images (e.g., snapshots) or dynamic images (e.g., video). The image capture devices can simultaneously capture static images (e.g., snapshots) or dynamic images (e.g., video). Multiple images from multiple image capture devices may be stitched together to form a smooth uninterrupted image (e.g., 90 degrees, 180 degrees, 270 degrees, 360 degrees). The image capture devices may be any type of camera, such as a Panasonic WV-SP306 or a camera that shares one or more characteristics with the Panasonic WV-SP306 or other cameras. The camera may collect images in high definition (HD). In some instances, the camera may collect images in color or black and white. The cameras may collect images at a fast frame rate (e.g., 25 Hz or higher, 50 Hz or higher, 75 Hz or higher, 100 Hz or higher). Cameras may capture images at a video rate. Cameras may optionally have high-sensitivity daytime/nighttime imaging capabilities with adaptive dynamic range. Compression, such as H.264 dual bandwidth video bandwidth compression may occur to permit low-bandwidth streaming and high-bandwidth recording. The cameras may optionally have an IP-based data connection. Individual communication and control of each of the cameras may be provided. In some instances, the cameras may be integrated in an automated face detection system. Facial recognition may be performed on images captured by the cameras. The camera can be in communication with a facial data base to determine the identity of an individual using the facial recognition. In some cases, the camera can be used to scan a group of two or more people to identify a specified person using facial recognition. Other types of optical analysis and recognition may be employed locally at the machine or remotely at a control center. A wide field image may be captured by a visible light camera. Images (e.g., snapshots or video) may be streamed to an external device such as a control center server in real-time. Alternatively, periodic or event-driven transmission may occur. In an example, the data machine can transmit images when the data machine detects abuse by an individual. The data machine can transmit images when the data machine detects a human or object in the environment. The data machine can transmit images when the data machine detects an interaction between two or more individuals.

Figure 5:
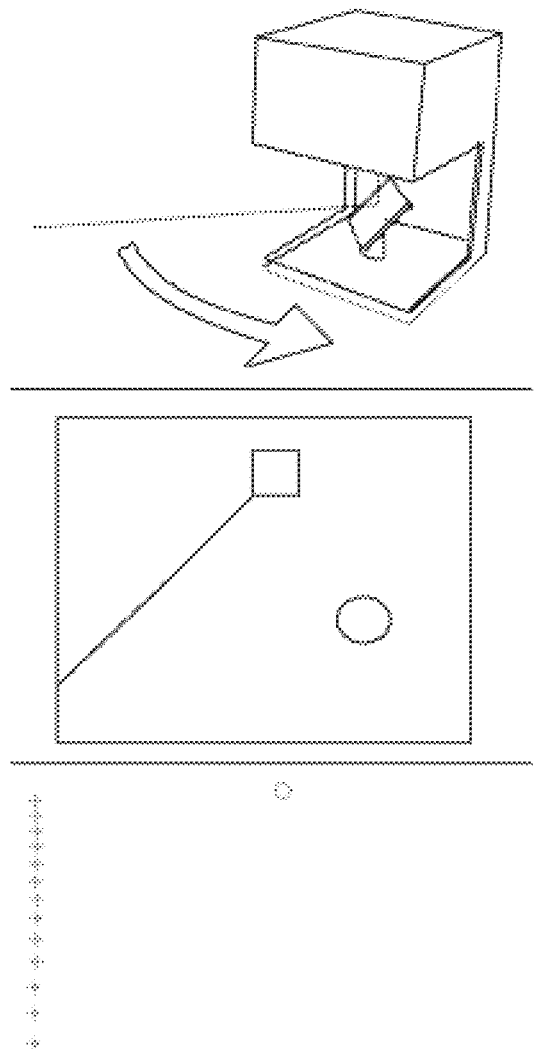
FIG. 5 shows an example of LIDAR which may be provided on the autonomous data machine.

FIG. 5 shows an example of LIDAR which may aid the autonomous data machine in being able to 'see' or perform visual detection. One or more laser beams (e.g., 600-1500 nm) may be scanned around in two dimensions to illuminate a surrounding environment. One or more sensor may gather measurements of distance and surface properties. A three-dimensional scan may be generated by combining scanning lasers in multiple planes. In some instances, a 360 degree horizontal field of view may be possible to implement with one sensor, or by combining multiple sensors. Multiple sensors may perform detection in different scanning planes and directions, such as forward, backward, horizontal, vertical or downward. One or more three-dimensional distance scans may be provided from a laser scanner (LIDAR).

The autonomous data machine can detect and identify letter, number, and/or other symbols. In some embodiments, automated license plate recognition (ALPR) sensors may be used. The ALPR sensors that may be used may include those from Vigilant Solutions, or share any characteristics with those used in Vigilant Solutions. ALPR may use visual imaging to aid in the license plate recognition. Such recognition may occur on-board the autonomous data machine, or may occur offboard at a control center or another location.

In some instances, optical character recognition may be provided. For example, the autonomous data machine may be able to 'read' letters and/or numbers. In some instances, facial recognition, expression recognition, or gesture recognition functions may be provided. In one example, an image capture of a face may be scanned and compared with other known faces in a database to determine if there is a match. One or more mapping function may also be provided. For example, 2D or 3D mapping may be provided based on images collected. Examples of audio analytics are provided elsewhere herein.

The autonomous data machine may be able to hear using one or more audio sensors, such as microphones. In some instances, directional audio may be used. Ambient noise may also be collected and/or analyzed. In some instances, ambient noise may be discernible from other noises of interest. The autonomous data machine cans subtract ambient noise when collecting audio to reduce unnecessary audio detections. In some cases, the autonomous data machine can detect unexpected changes in the ambient noise. For example, if an environment has a machine that is expected to operate and generate noise continuously the autonomous data machine may detect the absence of the machine operating noise. The autonomous data machine can determine that absence of the machine operating noise may indicate that the machine has shut down or failed unexpectedly. The autonomous data machine can make a call for service for the machine.

Additionally, the autonomous data machine may be able to perform one or more feeling functions. For example, thermal imaging and/or temperature sensing may occur for the autonomous machine to collect data about its environment. An infrared (IR) camera may be used to perform thermal imaging. IR cameras may be able to perform detection of heat emitting objects, such as human objects. The autonomous data machine can determine when a human has an unexpectedly low or high body temperature. Any IR camera known or later developed in the art may be used. Thermal images may be obtained in partial or complete darkness from an IR camera. Similarly, one or more proximity sensor may be employed. The proximity sensor may detect one or more obstructions, objects, structures, or living beings near the autonomous data machine. In some examples, an ultrasonic distance sensor 130d may be used to measure proximity to various objects. The ultrasonic distance sensor may function as a failsafe mechanism to capture objects that other sensors (e.g., 'seeing' sensors such as LIDAR and camera sensors) may not have captured to avoid collisions. In some instances, the ultrasonic distance sensors may have a range of about 15-30 cm. The ultrasonic distance sensors may be placed on and around the body of the autonomous data machine. For instance, 6-10 sensors may be provided around the autonomous data machine. They may encircle the autonomous data machine. Ultrasonic sensors as known or later developed in the art may be used.

A smell function may also be provided for the autonomous data machine. The smell function can comprise detecting one or more air borne molecules in the proximity of the data machine. For example, the autonomous data machine may be able to detect one or more chemicals, radiation, biological agents, and/or pathogens. Chemical analysis of a substance may occur and comparison may be made with information in a database. For example, databases of characteristics of substances may be downloaded to the machine or accessible by the machine. Such databases may be updated. Such substances may be detected through the ambient environment (e.g., air, water, soil, surface), or may be detected through one or more collected samples, such as air/gas samples, water samples, soil samples, biological samples, or other collected samples. The machine may self-collect samples or receive a sample provided by a user. The machine may be capable of detecting harmful environmental agents.

The autonomous data machine may also include a communication unit. The communication unit may optionally be provided partially or completely within a housing 120 of the autonomous data machine. The communication unit may provide communication between the autonomous data unit and a control center. The communication unit may also provide communication between autonomous data machines. In some instances, communication may occur between the autonomous data unit and third party devices, such as a security system of an environment being patrolled by the autonomous data machines, or mobile devices of individuals within the environment or related to the environment. Any communications provided herein may be two-way communications. Alternatively, some one-way communications may be provided (e.g., only from the autonomous data machine to an external device, or from an external device to the autonomous data machine).

Any of the communications provided herein may occur directly. Alternatively, they may occur over a network, such as a local area network (LAN) or wide area network (WAN) such as the Internet. Communication units may utilize LANs, WANs, infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. Further descriptions of possible modes of communication are described in greater detail elsewhere herein.

One or more controllers may be provided for an autonomous data machine. The controllers may include one or more processors that may perform one or more steps in accordance with non-transitory computer readable media that may define operation of the autonomous data machine. The processor may determine, based on data, how the autonomous data machine should operate (e.g., move in its environment, collect data, communicate with other devices or systems, provide alerts, control display, interact with individuals or its environment). The processor may make this determination in accordance with data collected by the autonomous data machine, received from the control center, and/or received from any other source.

A controller may have one or more memory units that may include non-transitory computer readable media that may comprise code, logic, or instructions for performing the one or more steps. For example, transitory computer readable media having algorithms for analyzing a state of the machine may be provided on-board the autonomous data machine and accessed by one or more processors of the controller. Algorithms for analyzing some of the collected data may also be provided on-board. The memory may store data collected by the sensors of the machine. In some instances, the data may be stored for a predetermined period of time (e.g., several hours, a day, several days, a week, several weeks, a month, several months). The data may be stored until the machine receives an instruction to delete the data. The data may be stored prior to being communicated to an external device or system. The data may be stored even if the data has also been communicated to an external device or system. In some embodiments, data from external data sources may also be stored in memory. For example, a map of the environment may be provided from a public database. Data pertaining to the map may be stored on-board the machine. In another example, data pertaining to social media in the area may be received by the machine and stored on-board the machine.

In some embodiments, a controller may use data collected by the machine in order to determine the state of the machine and/or determining the next acts of the machine. The controller may also optionally include data from external data sources, such as the control center, on-site data sources, static data sources, or social media data sources.

An operating system for a robotic machine may be used by the autonomous data machine. The robotic machine operating system may optionally dictate the performance of one or more of the controllers. The operating system may provide libraries and tools to help software developers create robot applications. It may provide hardware abstraction, device drivers, libraries, visualizers, message-passing, package management, and/or additional functionality. In some instances, the availability of a robotic machine operating system may enable a rapid commercialization of robotic technology.

Figure 7:
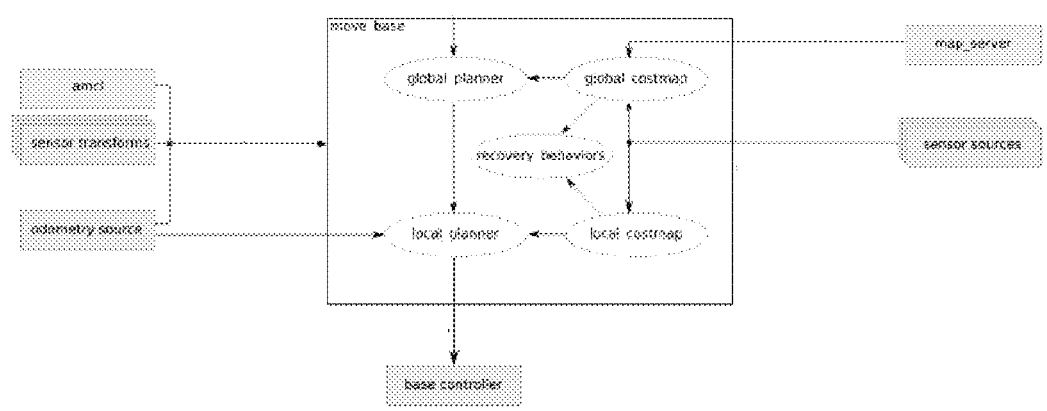
FIG. 7 provides an example of a robotic machine operating system implementation.

FIG. 7 provides an example of an implementation of a robotic machine operating system. The operating system may provide the core functions for the autonomous data machine. This may include anything from collision detection, path finding, or calculation of linear/turn speeds. Application specific interfaces to the operating system may be developed and used for the autonomous data machines.

As shown inputs may be provided to a robot motion and navigation controller (e.g., move base). This may include info from a map server, one or more sensor sources, one or more odometry sources, sensor transforms (i.e., which may transform sensor signals from the sensor sources to a sensor coordinate system to a global robot coordinate system), and/or adaptive Monte Carlo localization (amcl). Such information may go to a global planner, global costmap, local costmap, local planner, and/or recovery behaviors as identified. The robot motion and navigation controller may provide data to a base controller to effect movement of the autonomous data machine.

An autonomous data machine may have one or more interface units. The interface units may enable the autonomous data machine to communicate with one or more individuals in its environment. For example, the interface unit may have a visual component, such as a display. One or more lights (e.g., LEDs, OLEDs), or screens may be provided through which information may be displayed. For example, combinations of lights flashing in a pattern may provide information. In another example, a screen may show static words or images, or may show video images, such as dynamically changing words and/or images. The interface unit may have an audio component. For example information such as speech, music, or other sounds may be emitted through an audio interface (e.g., speakers). The audio and visual components may or may not be coordinated. The interface units may permit the autonomous data machine to communicate information to the one or more individuals. In some instances, a user may interact with the autonomous data machine and respond through the one or more interface units or other sensors. The machine may sense the user reaction and base one or more future communications on the user reaction. For example, the machine may ask a user to state a destination, and may register the user's audible response. The machine may use speech recognition to identify the user's stated destination, and then provide further information about the specific destination. In another example, when the autonomous data machine is being abused by a human the autonomous data machine can communicate a warning to the individual to stop the abuse. In some cases, a human can abuse the autonomous data machine by attempting to deactivate the data machine, hitting and/or kicking the data machine, attempting to knock over the data machine, intentionally blocking one or more sensors of the data machine, or performing any other action that may inhibit one or more functions of the data machine.

The autonomous data machine may be capable of human-machine interaction. For example, one or more sensors of the autonomous data machine may collect information about the human, and the information may be analyzed on-board the autonomous data machine or externally to interpret the human's communication. The data machine can determine an emotional state of the human. The data machine can determine an emotional state of the human using data collected by one or more sensors. In an example the autonomous data machine can detect a smile, frown, tears, dilated pupils, sweat, or other facial and/or body indicators of emotion. The autonomous data machine can detect auditory indications of the emotional state of the human. For example, the autonomous data machine can detect laughter, yelling, crying, screaming, or any other auditory indicators of an emotional state of a human.

For example, one or more microphones of the autonomous data machine may collect audio information from the human. Speech recognition analysis may be employed to identify what the human is saying. For example, the autonomous data machine may respond to verbal commands or cues. In some instances, the autonomous data machine may also be able to identify tones or volume of the human speech. Tones and/or volumes of human speech can indicate an emotional state of the human. For example, the autonomous data machine may be able to distinguish between normal speech and screaming or shouting. The autonomous data machine may be able to react to determined emotional states of the human. For example, if the human is determined to be in distress, the autonomous data machine may alert a third party, such as law enforcement, or any other party mentioned elsewhere herein.

One or more image capture devices of the autonomous data machine may collect visual information about the human. Facial recognition programs may aid in identifying the human. In some instances, facial expression recognition or gesture recognition analysis may occur. For example, the program may be able to distinguish between a smile and a frown, or may identify tears. In another example, certain arm or hand gestures may be recognized by the autonomous data machine. The autonomous data machine may communicate such information to a control center, or other external device. The autonomous data machine may or may not respond to the recognized facial expression and/or gesture. For example, the autonomous data machine may recognize attention-getting gestures (e.g., waving of arms), or other gestures (e.g., stop gesture). In another example of gesture recognition, the autonomous data machine may be able to recognize sign language. The autonomous data machine may be able to interpret the sign language and react accordingly, similar to as it would for speech recognition. The autonomous data machine may be able to react to the sign language, or any of the other gestures. The autonomous data machine can detect and react to an interaction between two or more humans. The autonomous data machine can determine if the interaction is a positive or negative interaction. Depending on a determination of a positive or negative interaction, the autonomous data machine may be able to take further action. For example, if a negative interaction is taking place, the autonomous data machine may alert a third party, such as law enforcement, or any other party mentioned elsewhere herein. The autonomous data machine may approach and/or issue a visual or audible output when a negative interaction is taking place. For example, the autonomous data machine may query the individuals whether any assistance is required.

The audio and/or visual information may be analyzed separately or together to determine a context and/or reaction of the autonomous data machine. For example, the combination of yelling and waving arms may more likely provide an alert condition than the combination of laughter and waving arms.

An autonomous data machine may communicate with humans in an environment, such as for greeting, response to an information request, display of status, display of crime risk, display of emergency messages, display of emotional or fun effects, or display of marketing messages. Some of the information may be automatically broadcast to humans. For example, during an emergency, such information may be announced by the autonomous data machine regardless of the actions of the humans around it. For example, a loudspeaker may make a blanket broadcast to anyone in the area that a tornado is imminent and people should seek shelter. Some of the information may be provided to the humans in response to a verbal or visual cue from the human. For example, a verbal request from the human for information pertaining to a particular topic may cause the autonomous data machine to provide the information about the topic.

The autonomous data machine may use various media for communication with the human. For example, the media may include audio, speech, images, light, motion, or movement. Any of the various interface units may be used to aid in the communication with the human. The autonomous data machine may 'speak' using audio speakers. The messages may include pre-recorded messages or may utilize a natural language user interface. The autonomous data machine may 'show' information using images, light, or through motion or movement. For example, a user may ask the autonomous data machine to direct the user to a particular location within the environment. Optionally, the autonomous data machine may guide the user to the location by moving toward the location.

The interaction units may be placed anywhere on the autonomous data machine housing. For example, one or more speakers may be positioned to be near the head height of a human, and permit the human to hear the sound from the autonomous data machine clearly. In another example, the image display units, such as screens, may be provided anywhere that may be easily viewed by the human. For example, the image display units may be roughly at eyesight level of a standing human, or anywhere else along the housing.

The exterior design of the autonomous data machine may include the placement of displays, interaction elements, visual presence and/or branding. In some instances, branding for the manufacturer and/or distributer of the autonomous data machine may be visually discernible on an exterior surface of the autonomous data machine. Optionally, branding of a company or organization that uses the autonomous data machines may be provided on the exterior of the autonomous data machine. For example, autonomous data machine may be used to patrol the offices of Company A, and/or provide helpful information to visitors of Company A. The autonomous data machines may optionally include Company A's branding information.

The exterior design of the autonomous data machine may include a coating that may permit the exterior surface to be weather or abuse resistant. For example, a spray-paint-resistant coating may be used. This may make it more challenging for a vandal to spray paint or alter the exterior surface Human-machine interaction may also include a reaction by the autonomous data machine to mitigate abuse. For example, if a human is attacking the autonomous data machine and/or attempting to destroy it, the autonomous data machine may provide an audible alarm. The autonomous data machine may also send an alert to an external device (e.g., security office of Company A), which may inform other parties that the autonomous data machine is being attacked.

In some embodiments, an autonomous data machine may have a payload. The payload may be transported by the autonomous data machine. Optionally, the payload may be separable from the autonomous data machine. Alternatively, the payload may be affixed to the autonomous data machine or integral to the autonomous data machine. In some instances, a sensor payload may be provided. In another example, a payload may be another autonomous data machine (of a same or different type).

Figure 8:
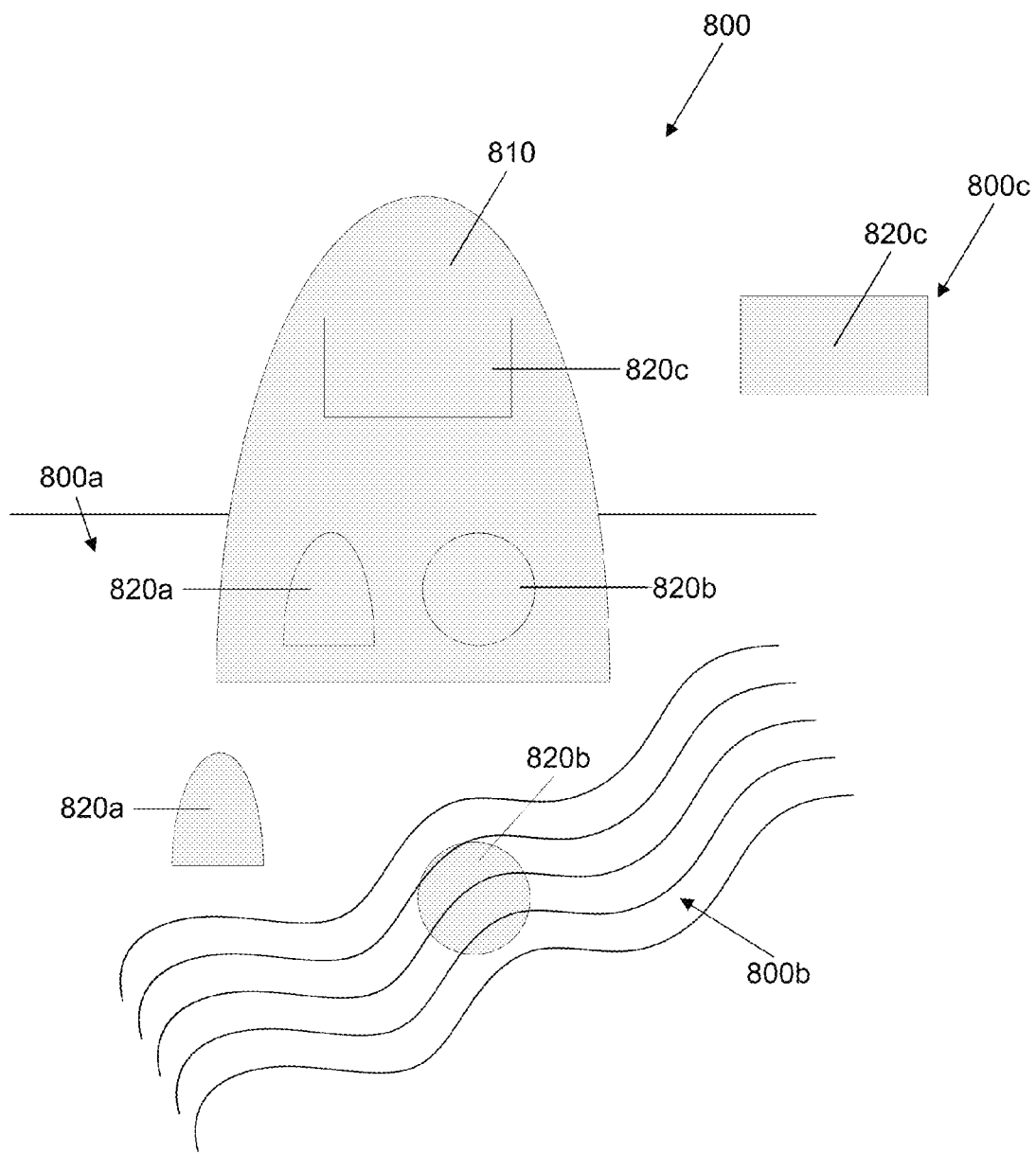
FIG. 8 shows an example of a modular deployment of autonomous data machines.

FIG. 8 shows an example of a modular deployment of autonomous data machines. An autonomous data machine 810 may be provided in an environment 800. The autonomous data machine may have a payload therein, which may include one or more other smaller autonomous data machines 820a, 820b, 820c. The autonomous data machines carried by the first autonomous data machine may have any of the characteristics of the autonomous data machine as described elsewhere herein. In some instances, the first autonomous data machine may carry the other autonomous data machines within its housing. A panel may open up to permit the other autonomous data machines to exit the first autonomous data machine.

The small autonomous data machines may be of the same type or may be of different types. In some examples, the small autonomous data machines may be configured to traverse the same type of environment or surface, or may be configured to traverse different types of environments or surfaces.

For example, a first type of autonomous data machine 820a may be configured to traverse a first type of environment/surface 800a while a second type of autonomous data machine 820b may be configured to traverse a second type of environment/surface 800b. A third type of autonomous data machine 820c may be configured to traverse a third type of environment/surface 800c. In one example, the first type of environment/surface may be a solid ground surface, while the second type of environment/surface may be water. In another example, the first type of environment/surface may be pavement, while the second type of environment/surface may be grass/mud/sand/dirt. In some instances, the first environment/surface may be finished or smooth, while the second environment/surface may be rugged, muddy, or slippery. The third type of environment may optionally be the air.

The various types of autonomous data machines may have different propulsion units or form factors that may permit them to traverse their environment. For example, an autonomous data machine traversing a more rugged surface may have larger wheels with more pronounced treads. In another example, an autonomous data machine configured to fly through the air may have propellers or rotors instead of large wheels. In some embodiments, a payload of the autonomous data machine may be an unmanned aerial vehicle (UAV). The payload may optionally include a release and retrieval mechanism and/or charging set up. The UAV may be tethered to the autonomous data machine or may be independent of the autonomous data machine.

The mini-autonomous data machines may be deployed under certain circumstances. For example, if the parent autonomous data machine encounters a type of surface or environment it can not traverse, it may deploy the corresponding type of autonomous data machine that can traverse it. In another example, if it encounters an event or condition where a large amount of data needs to be collected rapidly, it may deploy the mini-autonomous data machines. For example, the autonomous data machine may be normally traversing an environment and may encounter a car accident or explosion. It may deploy the other data machines to cover different angles of the situation and collect additional data.

The autonomous data machine and/or any of the smaller autonomous data machines may be designed for robustness and ability to tolerate an environment. For example, water ingress protection may be provided. The housing may prevent water from entering the body of the autonomous data machine and damaging the components therein. One or more sealing mechanism may be used to protect against water entering. In some instances, elastomeric materials may be provided at or near edges of pieces forming the housing. In some instances, a water repellent coating may be provided. Thus, the autonomous data machine may be able to tolerate external weather conditions, such as rain, wind, or snow. In some instances, the housing of the autonomous data machine may also have a protective coating to protect against the effects of sun.

In some embodiments, an autonomous data machine may have various systems, which may include a base vehicle system, electric system, vehicle motion control system, payload, communication, emergency, and computing environment, such as the systems described elsewhere herein. A base vehicle system may include a chassis, suspension system, wheels, brakes, steering, exterior panels, glazing, thermal control, reduction gear, mechanical power, and a transmission. The electric system may include an electric motor, HV power electronics, propulsion, battery pack, in-vehicle battery charger, wireless energy transmission to a vehicle via a charge pad, vehicle energy watchdog, LV power electronics, payload, vehicle controller, lighting, communication, sleep function, wiring, and fuses. The vehicle motion control may include a lateral controller (e.g., speed), directional controller (e.g., steering), exception handler, docking to reference points, and docking to a charger. The payload may include sensors, such as a top mounted sensor, inside mounted sensors, UAV, and UGV. Communications systems may be provided, including communications to infrastructure, cellular system, operator panel, UAV, and/or UGV. An emergency system may detect mechanical failure, electric failure, communication failure, accident/impact, when a machine is stuck, or when a machine is undergoing abuse. The computing environment may include hardware and software.

Systems

Figure 9A:
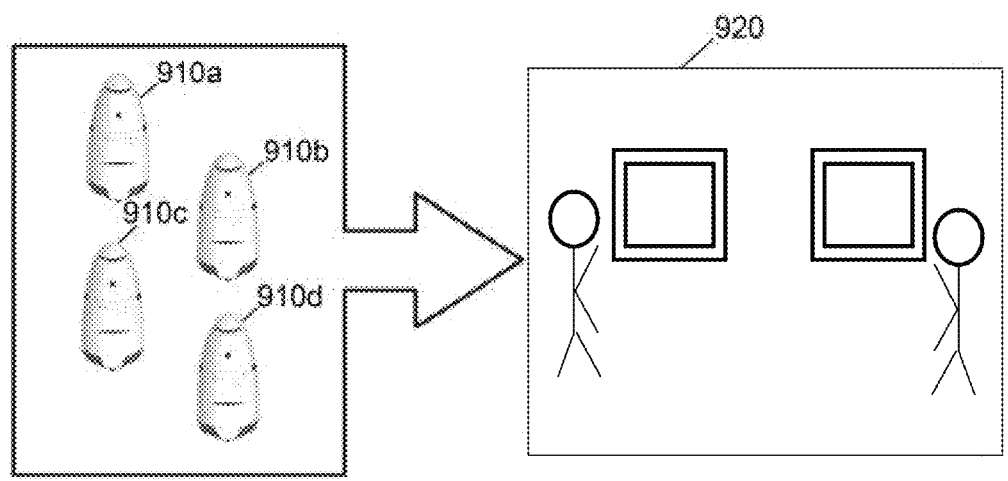
FIG. 9A shows an example of a plurality of autonomous data machines communicating with a control center.

One or more autonomous data machines may be part of an autonomous data system. FIG. 9A shows an example of a plurality of autonomous data machines 910a, 910b, 910c, 910d communicating with a control center 920. The autonomous data machines may be provided at the same location or at different locations. For example, they may be within the same environment or a different environment. The control center may be at a site remote to the autonomous data machines. For example, the control center may be at a structure that is outside the area that the autonomous data machines roam. Alternatively, the autonomous data machines may be able to roam the same structure that may be housing the control center.

The control center may receive information from the autonomous data machines and/or provide data (which may include instructions) to the autonomous data machines. The control center may include one or more processors and/or memory units that may permit the control center to analyze data and generate instructions. One or more displays may be provided, through which control center administrators may view the data and/or interact with the system.

Figure 9B:
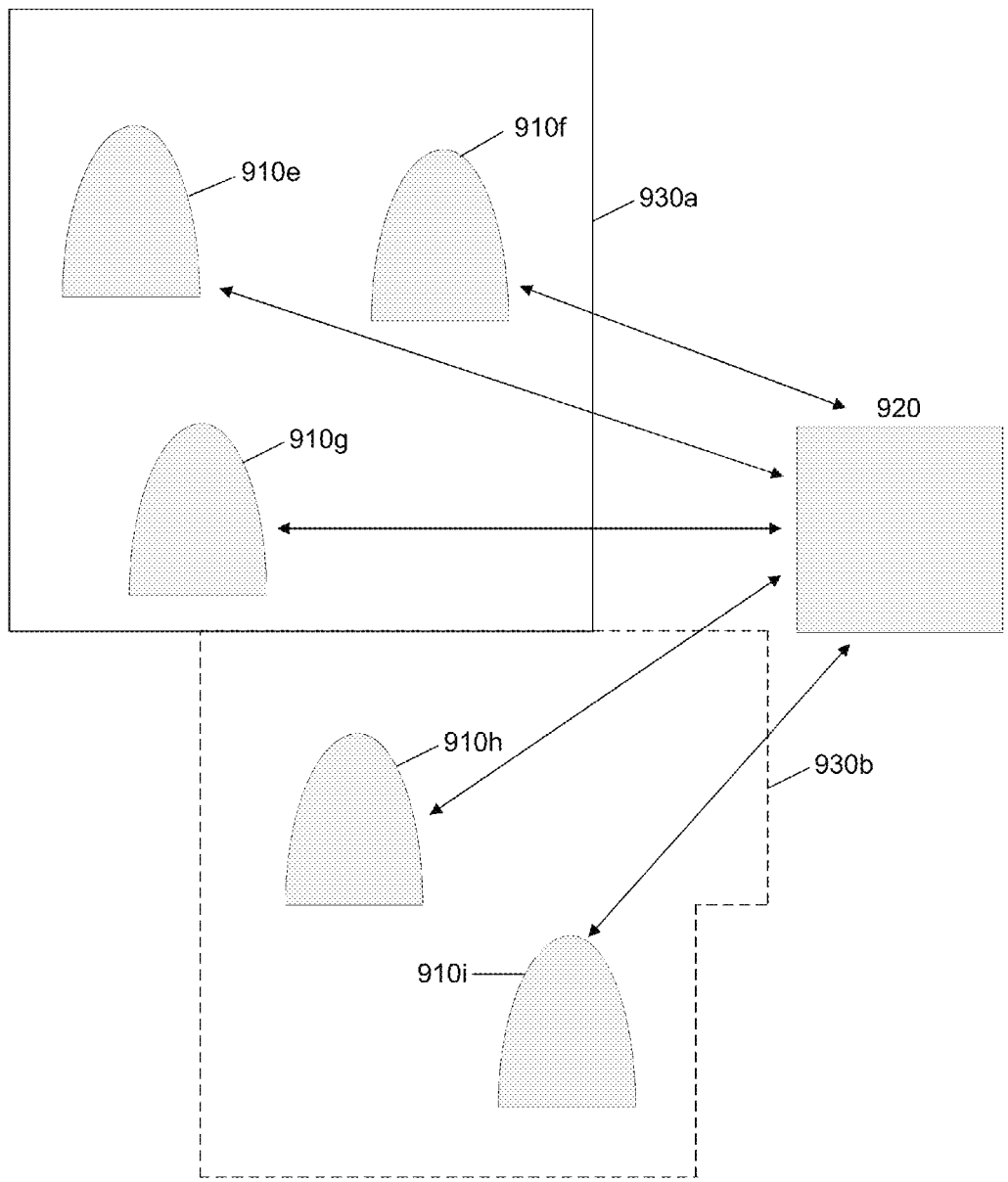
FIG. 9B shows a plurality of autonomous data machines deployed within different geofences in communication with the control center.

FIG. 9B shows a plurality of autonomous data machines 910e, 910f, 910g, 910h, 910i deployed within different geofences 930a, 930b and communicating with the control center 920. The geofences may include virtual perimeters of real-world geographic areas. The geofence could be dynamically generated (e.g., as in a radius around a structure or point location). Or a geofence can be a predefined set of boundaries, like school attendance zones or neighborhood boundaries. Custom-digitized geofences may be used. The geofence boundaries may or may not overlap one another. Areas enclosed in the geofences may or may not overlap one another. The autonomous data machines may be provided within the same geofence or may be deployed within different geofences. In some embodiments, each geofence may be defined by a user of the autonomous data machines. For example, Company A may be a user of the autonomous data machines to monitor Company A's site. Company A may define the boundaries of the geofence within which the autonomous data machines may roam.

The autonomous data machines may all be the same type of autonomous data machines or may include different types of autonomous data machines. These may include autonomous data machines of different form factors or having the ability to traverse different environments. The various autonomous data machines may also include small autonomous data machines that may be deployed as payloads of other autonomous data machines.

A pre-defined location or area may be provided for an autonomous data machine. The machine may move within the predefined area or location. Optionally, a geofence may mark the boundaries of the area or location within which the autonomous data machine may roam. In some instances, the environment may be an outdoor environment. In other examples, indoor environments may be provided. A machine may be able to freely traverse within the indoor and/or outdoor environment. Movement may be based on a-priori knowledge (e.g., maps and waypoints), sensors on the machines (e.g., LIDAR, camera, infrared, proximity, motion), support signals (e.g., assisted GPS beacon, color patterns, RFID) and autonomous data machine algorithms. The autonomous data machines may be a standalone unit or a swarm of robots. The a-priori knowledge may be communicated from the control center, or from any other external device. For example, the machines may independently pull public information, such as map information, from the Internet or any other data source. In some instances, the machines may access information provided by a user of the machine (e.g., Company A that is deploying the machines may have maps of Company A's property with detailed features such as paved paths, structures, etc.). The machines may be able to learn the machines' environment. For example, as they encounter obstructions they may create a map of the obstructions or other features. When multiple machines a provided within an environment they may share this information with one another and thus be able to more rapidly learn about features of the environment (e.g., obstructions, paths, inclines, structures, types of surfaces, traffic, etc.).

Autonomous data machines may observe and analyze their environment based on a-priori knowledge (e.g., work schedules, license plate database, user databases), sensors on the machines (e.g., LIDAR, camera, infrared, proximity, motion), supporting information (e.g., external databases) and autonomous data machine algorithms. Examples of additional data sources that may be used by the autonomous data machines may include news, social media, on-site sensor data, user information, local traffic information, worker's schedule information, motor vehicle association information, map information, information from law enforcement, local private security information, local event information, or any other type of information. For example, the machines may pull local news and see that a crime had been committed nearby. The information collected through the machine sensors may be filtered with knowledge of this news—for example, an individual matching the description of the suspect of the crime running away quickly may raise an alert. The machines may perform actions based on the totality of the information, which may include the information from other sources as well as the information from the sensors. This analysis combining different types of information or information from different sources may occur on-board the autonomous data machines. The data machines may be able to pull information from the various sources in real-time. Alternatively, some or all of the analysis may occur off-board. For example, the autonomous data machines may be capable of communicating with a control center which may perform some or all of the analysis pulling together different sources of information. The control center may then formulate instructions for how the autonomous data machines should respond.

The autonomous data machines may collect information which may be communicated to the control center. The control center may aggregate the data collected from the autonomous data machines. Some of the data collected from the autonomous data machines may be reflective of the state or condition of the autonomous data machines. For example, the state of the autonomous data machines may include machine critical parameters such as health, location, available range, charging events, and/or abuse. Some of the data collected by the autonomous data machines may be reflective of the mission of the autonomous data machines (e.g., surveillance images if the mission of the autonomous data machine is surveillance). The data from the autonomous data machines may also be combined with data from other sources (e.g., social media, third party databases, public information). The information from autonomous data machines may also be sent to other autonomous data machines or to the user of the autonomous data machines (e.g., Company A).

Interaction and control of the one or more autonomous data machines may occur through the control center. In addition to monitoring the data collected, the control center may send instructions or information to the autonomous data machines. In some instances, the instructions may be formulated by the control center in response to data collected from the control center. For example, information about a state of the autonomous data machines may be used to formulate instructions to the autonomous data machines in response to the state. For example, if the autonomous data machine is running low on charge, an instruction may be provided to go ahead and charge at the nearest charging station. If the autonomous data machine is undergoing abuse, an alert may be provided to a user of the autonomous data machine, or an instruction to provide an audible alarm may be provided.

An autonomous data machine may be able to identify critical events and react accordingly (e.g., raise an audible alarm, launch a UAV, travel to investigate further, retreat to avoid damage) and/or to transmit specific information to the control center (e.g., high-bandwidth image data). The autonomous data machines may take commands from the control center in response to a specific situation or critical event (e.g., "go to location X", "show information Y"). Alternatively, the autonomous data machines may be able to formulate their own instructions and determine how to respond without aid of the control center. Thus the autonomous data machines may be able to determine how to react on-board without the aid of any external device, or may receive instructions from an external device on how to respond. The instructions from the control center or any other external device may be generated automatically without requiring any human intervention. Alternatively, some human intervention and/or instruction may be provided. Instructions generated automatically (e.g., on-board the machine or externally) may incorporate information collected by the sensors of the machine and/or additional data sources (e.g., a-priori data sources, external databases, public information, information collected from webcrawling, etc.). Instructions may elicit reactions by the autonomous data machines. Examples of reactions by the data machines may include but are not limited to: movement, deployment of other autonomous data machines, display of information, audible sounds, collection of specific types of data, communication of specific types of data, communication with certain devices or parties, or charging.

Figure 11:
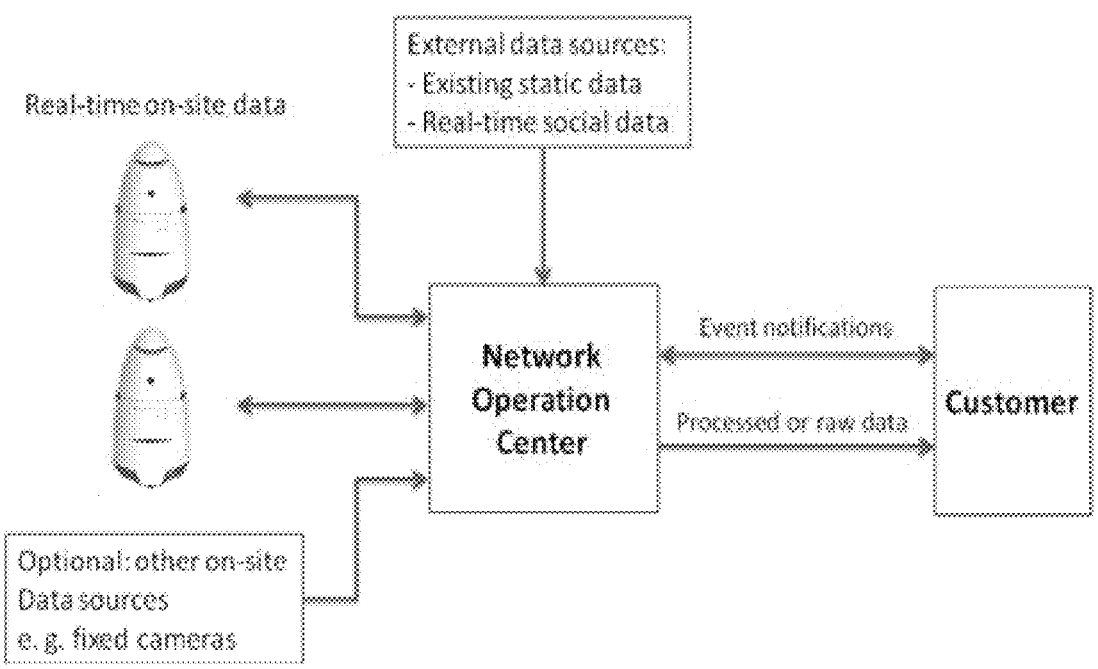
FIG. 11 shows an example of data analytics in accordance with an embodiment of the invention.

FIG. 11 shows an example of data analytics in accordance with an embodiment of the invention. One or a plurality of autonomous data machines may be provided. They may collect real-time on-site data using one or more sensors. In some instances, other on-site data sources may be provided. For example, fixed cameras, microphones, or other types of sensors may be provided. The other on-site data sources may be provided in connection with a pre-existing security system. For example, a structure or environment may have security cameras and/or microphones set up. These may provide additional on-site data in conjunction with the roaming machines. The on-site data may be communicated to a network operation center (NOC), which may also be referred to as a control center.

External data sources may be provided to the NOC. The external data may include existing static data and/or real-time social data. Such external data may also be conveyed to the autonomous data machines, indirectly via the NOC, or directly.

The NOC may also communicate with one or more customers. The customers may be individuals or organizations that may be utilizing information collected by the NOC. The customers may optionally have one or more autonomous data machines deployed at the customer sites. Alternatively, they may have access to data collected and/or generated by the NOC. Processed or raw data may be sent from the NOC to the customer. This may include processed or raw data from sensors of the machines, or other on-site data sources. Event notifications may be communicated between the NOC and the customers. For example, the customers may inform the NOC of certain events and vice versa.

In some instances, the control data may be able to track the state of multiple autonomous data machines. For example, multiple autonomous data machines may be provided within the same geofence. The location of each of these machines may be tracked. If one of the machines detects a particular condition, additional machines may be deployed to that location investigate further. In another example while one of the machines is charging, the travel path of another machine may be altered to accommodate for the machine that is out of play while charging.

This may aid in optimization of utilization, uptime, lifetime, operating costs, maintenance costs, of one or more autonomous data machines from the control center. The control center may be able to manage a fleet of the autonomous data machines to optimize conditions. The provision of multiple autonomous data machines may advantageously permit them to interact or respond to situations in a concerted manner, thus providing a synergistic effect.

The autonomous data system may be used in the planning and execution of missions with the one or more autonomous data machines. Missions may be planned or dictated at the control center. Alternatively, missions may be planned and/or dictated by a user. The missions parameters may be communicated to the autonomous data machines or may be entered directly to the autonomous data machines. The mission may include one or more goals that may dictate the behavior of the autonomous data machines. In some embodiments, one or more types of missions may be pre-set. Alternatively, custom missions may be generated. Missions may define general and/or specific behavior of the autonomous data machines. For example, the missions may define the type of data collected by the autonomous data machines, the type of paths that the autonomous data machines will take or types of movement they will make, how the autonomous data machines will interact with humans, the types of communications sent by the autonomous data machines, the alert conditions, charging schedules, or other types of behaviors or reactions.

Some examples of types of missions may include, but are not limited to, surveillance, security, school safety and security monitoring, parking monitoring and management, wireless network detection or management, telecommunications device detection or management, guidance and/or information, or any other implementations. Examples of types of implementations using different missions are described in greater detail elsewhere herein.

Communications

The autonomous data machine may communicate with one or more external devices using any communication technique or combinations of communication techniques. The one or more external devices may include a control center (e.g., network operation center), other autonomous data machines, user security center or office, mobile devices of individuals in the area, or any other devices.

In some examples, communication between an autonomous data machine and a control center may cover time and location varying available communication bandwidth, e.g., buffering and time-delayed transmission. In some instances, the availability of the bandwidth may be detected and the data stream may be adjusted in response. For example, if the available bandwidth is low, the machine may delay sending large data files and may prioritize smaller data files that provide the crucial information. For example, rather than sending high resolution images, lower resolution images may be transmitted to the control center.

Figure 10:
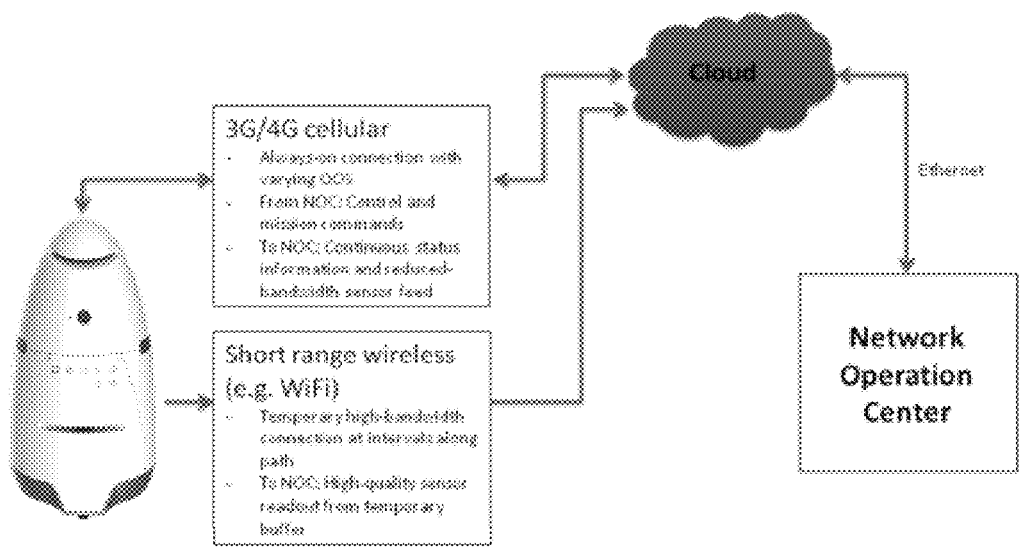
FIG. 10 shows an example of different communication channels that may be used.

Communication may occur over multiple different communication channels to cover varying available communication bandwidth. FIG. 10 shows an example of different communication channels that may be used. An autonomous data machine may communicate with a network operation center (NOC). In some instances, it may use a long-range communication, such as a telecommunications network (e.g., 3G/4G cellular communications). It may also use short-range communication, such as short range wireless communication (e.g., WiFi). The long-range communication may be an always-on connection with varying QOS. From the NOC, control and mission commands may be provided. To the NOC, continuous status information may be provided and reduced-bandwidth sensor feed. The short-range communication may be a temporary high-bandwidth connection at intervals along the path. To the NOC, high-quality sensor readout from temporary buffer may be provided.

In some instances, the long-range communication may include one or more relay stations (e.g., ground stations, towers, satellites) between the autonomous data machine and the NOC. In some instances, the short-range communication may be direct communication between the autonomous data machine and the NOC, or point-to-point communication.

Thus, in some instances, a lower bandwidth connection may be continuously and reliably provided. This may permit the machine to function and send some information back to the NOC. However, in some instances, it may be desirable to send larger quantities of data, which may require a higher bandwidth. A second higher bandwidth connection may be temporarily established in order to permit the transmission of the greater amount of data (e.g., high definition image files). The higher bandwidth connection may be established in response to a detected condition by the machine. The machine may initiate the higher bandwidth connection. In other instances, the NOC may review information passed by the machine on the lower bandwidth connection and detect a condition where it may be desirable to pull more information. The NOC may optionally initiate the higher bandwidth connection. The higher bandwidth connection may occur periodically in accordance with a predetermined frequency or schedule, and/or may occur in response to a detected event. The higher bandwidth may be provided concurrently with the lower-bandwidth connection, or may be provided as an alternative to the lower-bandwidth connection. Information may be passed simultaneously along both bandwidths, or may only occur through a single selected bandwidth at a time.

In some instances, the communications may pass through the cloud. In other instances, direct communications may be employed. In some instances, the NOC may have an Ethernet connection to the cloud. Any other type of connection may be employed.

The data streams from or to the autonomous data machines may be compressed. In some embodiments, compression of the data streams in the autonomous data machines may limit bandwidth requirements based on available bandwidth, required data fidelity and relevance of contained information. In some instances, compression may occur by discarding static information, and/or permitting transmission of data only when changes occur or only when a critical situation is detected. Accordingly, compression may occur to fit the available bandwidth. As shown in FIG. 10, if the data does not fit the available bandwidth, additional channels of communication may occur.

Digital watermarking may occur between communications between the autonomous data machine and the NOC. The digital watermark may be information covertly hidden in the carrier signal. The digital watermarking may be used to verify the authenticity or integrity of the carrier signal or to show the identity of its owners. Digital watermarking may be provided to ensure legal compliance. In some instances, the digital watermarking can be used for tracing copyright infringement of the transmitted media.

In some embodiments, data transmission may occur while the autonomous data machine is charging. When the autonomous data machine is charging it may need to temporarily stay at a predetermined location. Transmission of large data (e.g., high resolution video data) that is not immediately time critical may preferably occur during charging. In some instances, some of the data collected by the machine sensors may be stored at the machine and not immediately transmitted. The stored information may then be transmitted while the machine is charging or at other convenient times. The stored information may be transmitted when a higher bandwidth channel is opened up.

Charging

The autonomous data machines may have a rechargeable power supply, such as rechargeable batteries. The batteries may permit the autonomous data machines to operate without charge for an extended period of time. For example, from a full charge, the autonomous data machines may be capable of operating at least 1 hour or more, 2 hours or more, 3 hours or more, 4 hours or more, 5 hours or more, 6 hours or more, 8 hours or more, 10 hours or more, 12 hours or more, 16 hours or more, 20 hours or more, 24 hours or more, 36 hours or more, or 48 hours or more. In some instances, the maximum amount of time that the autonomous data machine may be capable of operating without charge may be about 8 hours, 10 hours, 12 hours, 16 hours, 20 hours, 24 hours, 36 hours, 48 hours, or 72 hours.

While the autonomous data machine is not charging, it may be capable of roaming about its environment. In some instances, it may have a preplanned path. For example, the machine may cycle through one or more predetermined routes repetitively. It may alter its route if it detects a condition of interest. For example, if it detects an event occurring or interacts with a human, it may alter its route. Alternatively, it may randomly wander within certain parameters. A path may be randomly generated (e.g., randomly generated ahead of time or made-up as the machine goes). The autonomous data machine may also be capable of collecting data (e.g., images). An autonomous data machine's path may be altered based on the collected data. In some instances, the roaming may occur freely in any direction in the environment. In other instances, the roaming may be limited by certain parameters within the environment. For instance, the machine may be limited to a certain type of surface (e.g., paved surface). The machine's path may or may not depend on the location of other machines in the environment. For example, a user may specify that under normal conditions it may be desirable to spread out the machines within the environment, so paths may be generated to avoid dense clustering and provide a more even distribution of machines.

In some instances, the autonomous data machine may operate at different power consumption levels. For example, the autonomous data machine may have a default state where it may effect some movement and some data collection. However, when it detects particular conditions, a higher power consumption state may be provided. For example, if it detects an interesting event occurring, it may move toward the event to investigate further and employ continuous use of additional sensors, which may use more power. It may also communicate more actively with external devices, such as the control center, which also use more power. In some instances, the autonomous data machine may be at a 'resting' or 'sleeping' state where it is performing minimal movement or data collection. However, the autonomous data machine may be roused from its resting or sleeping state when it detects certain conditions.

Figure 12A:
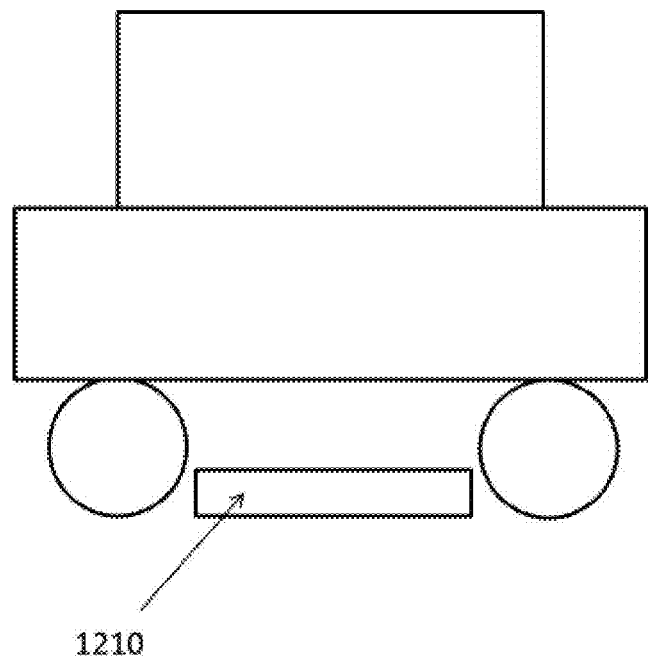
FIGS. 12A and 12B shows examples of inductive charging mechanisms in accordance with an embodiment of the invention.
Figure 12B:
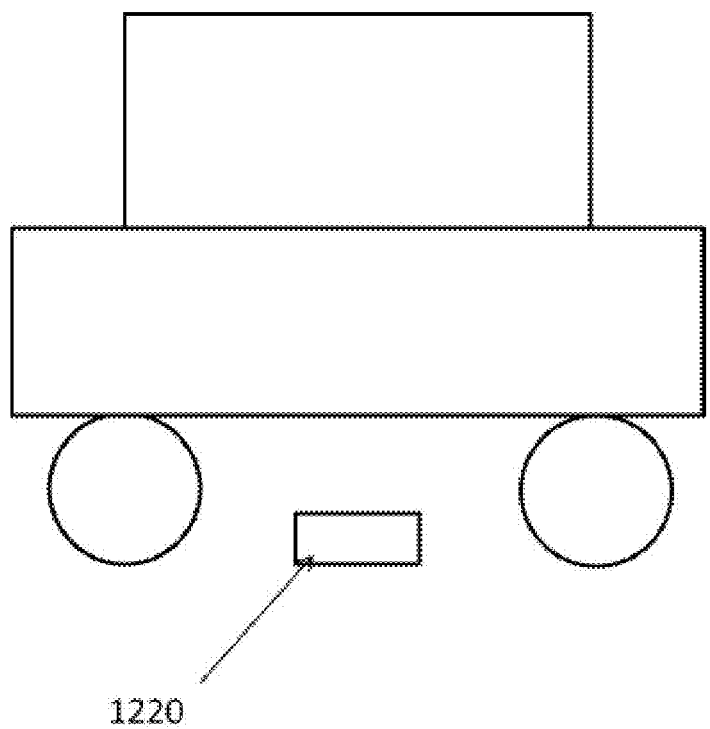

The power supplies of the autonomous data machines may be recharged using any technique. For example, one or more inductive charging mats may be employed. The charging mat may be a wired or wireless mat. FIGS. 12A and 12B shows examples of inductive charging mechanisms in accordance with an embodiment of the invention. A mat 1210 may underlie a machine. Another inductive charger 1220 may be provided over which the machine may drive. The inductive chargers may be located on a ground and the autonomous data machines may drive over the inductive chargers. In another example, the inductive chargers may be provided on a wall, and the inductive chargers may drive over to the wall to charge. The inductive charging mechanisms may permit the autonomous data machines to recharge without having to plug-in or create a mechanical connection. In alternative embodiments of the invention, plugs or mechanical connections may be used.

In some instances, the amount of time the autonomous data machines spend charging may be less than 1%, 3%, 5%, 7%, 10%, 15%, 20%, 25%, or 30% of the amount of time it spends in operation. For example, a 5 minute charge may be sufficient to keep the autonomous data machine operational for more than 15 minutes, 20 minutes, 30 minutes, 45 minutes, an hour, or two hours. In another example, an hour charge may be sufficient to keep the autonomous data machine operational for more than four hours, six hours, eight hours, ten hours, 12 hours, or fifteen hours.

In some embodiments, the autonomous data machines may determine an optimum charging schedule. The optimum charging schedule may depend on the mission of the autonomous data machines, availability of other autonomous data machines, placement of charging stations, or any other factors. For example, if many charging stations are provided at different points throughout the location, the autonomous data machines may charge for shorter periods of time, because the likelihood that a charging station will be nearby and available may be increased. By contrast if fewer charge stations are provided and are only at a particular location, the autonomous data machines may charge for longer since they will likely be traveling a longer path during which fewer charging stations may be available. The length of charge may depend on availability of other machines to take the charging machine's place. For example, if a particular region is to undergo continuous surveillance, an autonomous data machine may charge for a longer period of time if other machines are available to patrol that particular region. If fewer machines are available, the autonomous data may charge for a shorter period of time, to patrol the region until other machines can come over and take its place.

The autonomous data machines may remain powered on while charging. For example, while an autonomous data machine is sitting on an inductive charging mat, it may still perform data collection, analysis and/or communication functions. The controller may also remain in operation. This may provide maximum uptime for the autonomous data machine.

In one example, while the autonomous data machine is charging it may be generating a surveillance path. For example, generation of a random surveillance path and timing may be provided in conjunction with vehicle charging. Generation of the random surveillance path may take into account a future charge time and/or location. In some examples, the surveillance paths of the machines may vary. New paths may be generated while the machines are charging. These new paths may take into account mission parameters, locations of other machines, and/or charging requirements and/or availability of charging stations.

An additional example may provide that data transmission may occur while the autonomous data machine is charging. When the autonomous data machine is charging it may need to temporarily stay at a predetermined location. Transmission of large data that is not immediately time critical may preferably occur during charging. Data transmission may also use charging power connection as an additional data channel, such as by modulating information on top of a charging energy stream to transmit data.

In another example, while the autonomous data machine is charging, additional surveillance may occur with aid of a smaller autonomous data machine. For instance, air surveillance may occur while charging. A UAV (e.g., tethered UAV) may be used which may obtain power from the autonomous data machine or directly from the charging station. The UAV may input data to the machine while it is autonomously charging on the charging mat, and download information. This may protect the autonomous data machine while charging and still maintain surveillance capability from above. For example, the UAV may capture images of the autonomous data machine and surrounding environment. If the UAV detects a condition that may cause alarm, it may send the information to the autonomous data machine to stop charging and react.

Service/Abuse

Autonomous data machines may have self-protection or preservation protocols. In one example, autonomous data machines may authenticate individuals before providing the individuals with access to the autonomous data machines. In some instances, only certain privileged personnel may be authorized to access the machines. The access may be provided for service, repairs, maintenance, control, or data access.

The authentication of the individual may occur via one or more interaction channels, such as wireless, IR, or visible light signal, visual pattern (e.g., similar to QR code), RFID, or other electromagnetic systems. For example, the individuals may have one or more device that may emit a signal detectable by the machines, and that may authenticate the individuals. In another example, the individuals may speak a password or phrase that may be recognized by the machines. Similarly, an image may be captured of the individuals, and if their face or appearance matches that of pre-approved personnel they may be provided access. Similarly, a fingerprint, handprint, retinal scan, or other biometric data may be used to authenticate the individual and provide them with access to the machine.

If an individual is not authenticated or recognized as privileged personnel, they may not be granted access to the machines. For example, the machines may not open an access port or panel to provide the individual access to the relevant portions of the machine. In another example, the machines may retreat from the individual if they fail authentication. Furthermore, the machines may issue an audible alarm or send an alert to an external device or user if the individual persists in trying to gain access.

The autonomous data machines may resist abuse. For example, they may have a spray-resistant coating that may prefer vandals from spray painting the machines. They also have a robust housing that may be resistant to water or dents. For example, even if the machine is hit by a stick or other item, the housing may protect the autonomous data machines.

The autonomous data machines may be capable of detecting and reacting to physical abuse. Examples of physical abuse may include, but are not limited to, tipping, carrying away, moving away on trailer, tampering, hitting, or similar actions. Detection may occur using location, position, motion, and other sensors such as the IMU, GPS, a wheel encoder, LIDAR, camera, or microphone.

If an attack on the autonomous data machine is detected, it may provide an audible alarm (e.g., similar to a car alarm). It may also provide a visual display to attract attention (e.g., flashing of bright lights). The autonomous data machine may record a user abusing the data machine and store and/or transmit the recording. The autonomous data machine may spray a permanent dye, pepper spray, or other substance on a human that abuses that autonomous data machine. The autonomous data machine may deliver a mild electric shock to a human that abuses the autonomous data machine. The autonomous data machine may retreat from the human. It may also send alerts to one or more external device. For example, it may send information to a local law enforcement, private security, or other security station (e.g., "call for help"). It may also information additional autonomous data machines. For example, if other machines are in the proximity, they may come closer and provide their own alarms and capture additional images of the situation. The machine may also recording and communication of the situation.

Autonomous data machines may be able to sense conditions of the machine using one or more sensor. In some instances, the machines may be able to sense a condition where there may be damage to the machine, regardless of whether a human was involved. For example, a temperature sensor may pick up an unusual amount of heat within the machine. The machine may or may not try to self-diagnose the problem. An alert may be provided to an authorized individual to investigate the problem further. The machine may or may not take action in response to certain problems. For example, if unusual overheating is occurring it may shut down part or all of its functions.

In some instances, the autonomous data machines may be semi-autonomous. Control of the movement of the autonomous data machines may occur utilizing gestures, such as hand gestures or body position (e.g., using a Leap Motion type sensor). In some instances, this gesture based control may only operate for individuals who are recognized as privileged personnel. Alternatively, gesture based control may also occur for any other individual regardless of whether they are privileged. Other types of speech-based control may also be employed or recognized. In some instances, the responsiveness of the machine to an individual may depend on the type of command. For example, only privileged personnel may be obeyed for a command to open up a control panel to provide access to the interior of the machine, while anyone may be obeyed for a command to stop moving.

The autonomous data machines may be capable of detecting and reacting to hacking. For example, analysis of usage and communication patterns may occur. Also, this may occur by matching location of wireless communication with known authenticated locations and media, such as WiFi access points and cell phone towers. If commands are detected as coming from unauthorized sources, authorized sources may be alerted and/or the machines may ignore the 'hacked' commands until they are verified.

Implementations

Autonomous data machines may be used in various implementations or under combinations of various implementations. The autonomous data systems, which may include the control center may also be used in the selected implementations.

One or more mission may be provided for the machines. The missions may define the implementation of the machines, and the types of actions that will be taken by the machines. The missions may dictate how the machines move and react to certain situations. The missions may also dictate the type of information that is collected and transmitted to a control center, and conditions under which certain communications may occur. The following implementations are provided by way of example only. In some instances, autonomous data machines may arrive pre-loaded with missions. Alternatively, they may be given new missions, or missions may be reassigned or redefined. In some instances, software may be downloaded to the machines to determine the missions and/or provide later versions or implementations of the missions. Missions may be provided and/or controlled by the control center. Alternatively, missions may be provided and/or controlled by a user (e.g., Company A that may be using the machines to monitor Company A's environment). In some instances, missions may be selected from a predetermined set of missions. Alternatively, custom missions may be created. Missions may set general parameters and/or specific parameters in how the machines will operate.

Figure 13:
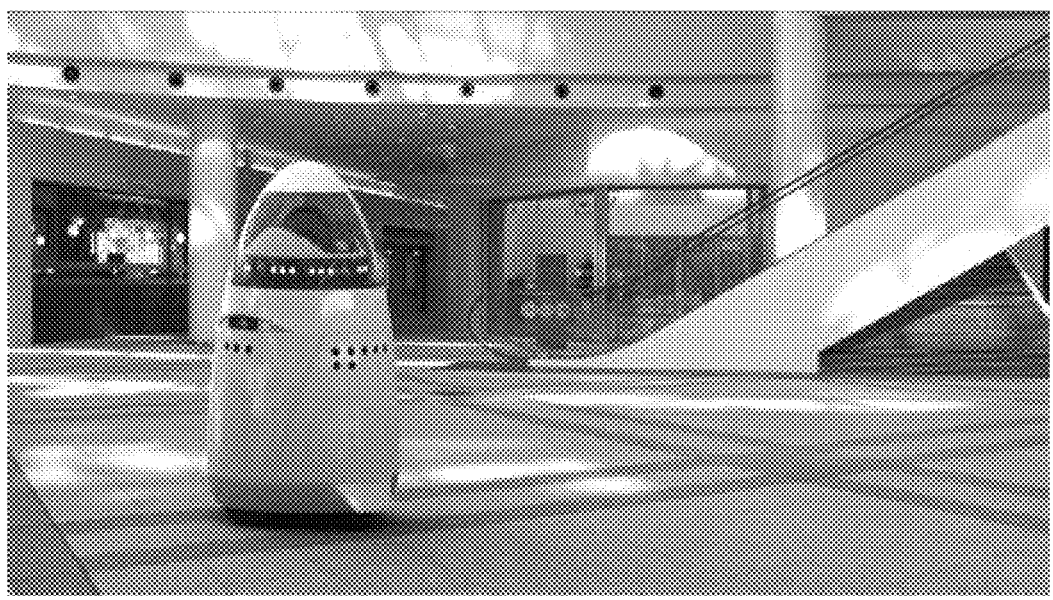
FIG. 13 provides an example of an autonomous data machine patrolling a designated environment.

Security applications may be provided for autonomous data machines. The mission of the autonomous data machines may be to increase security of a location. The autonomous data machines may provide security at a defined location or within a particular environment. For example, the machines may perform perimeter surveillance of environments such as a data center, airport, seaport, ground transportation center, home, subdivision, neighborhood or community, mall, art gallery, corporate campus, school, traffic hub, construction site, hospital, military installation, sporting event, concert, live performance, warehouse, or any other location or environment. FIG. 13 provides an example of an autonomous data machine patrolling a shopping center. The machines may be capable of detecting movement of physical objects using one or more sensors. The detected movement may be recorded with a time and location stamp. For example, the machines may detect the presence of one or more humans in the vicinity. In some instances, the humans may be authorized or not authorized to be at the location. The machines may be able to identify whether the detected humans are authorized to be at the location. For example, during business hours the public may be authorized to be at a location, while after business hours, only security staff may be authorized to be at the location. The machines may also be capable of detecting before/after situations. For example, the machines may visit a location at a first time, and then visit the same location again later at a second time. The machines may be able to quickly identify differences at that location between the first and second time. For example, the machine may see that an item is missing or out of place.

In some embodiments, the presence of the autonomous data machines may aid in security, even without performing any actions. For example, the physical presence of the machines may have a crime deterrent effect. The physical presence/appearance may be optimized to maximize the crime deterrence effect. For example, if a potential criminal knows that the machines are around and are capable of capturing potentially incriminating data and/or raising alarms, the criminal may avoid the area at which the machines are present. Thus, the mere presence of the autonomous data machines may reduce the rate of crime at a location where they are deployed.

Security applications may cause the autonomous data machines to utilize audio analytics. Detection and analysis of background and environmental noise for the purposes of monitoring and security may include analysis of footsteps, raindrops, car alarms, home burglar alarms, smartphones, voices, vehicle exhaust, gunshots, leaves, wind, garbage trucks, air conditioning units, fire alarms, tires squealing, car horns, vehicle engines, police sirens, ambulance sirens, fire truck sirens, papers shuffling, car door closing, screaming, music or other types of sound. The audio analysis may be able to separate background noises from significant noises. The significant noises may be analyzed to determine whether an alert condition is provided. For example, the sound of screaming or gunshots may be reason for the autonomous data machines to provide an alert to law enforcement or a private security, while normal conversational voices are not.

Detection and analysis of background and environmental noise may also be performed. This may occur for the purposes of navigation in complex environments. For example, identification of a car honking when monitoring a parking lot may identify and localize a potential navigation conflict with one or more cars, such as backing in and out of parking lots within the motion of the autonomous data machines.

The system may provide alarm integration. For example, in a security implementation, one or more autonomous data machines may be coupled to an existing security system. For example, if the autonomous data machine is patrolling outside a home, it may be couple to the home's existing burglar alarm system. In another example, if the autonomous data machine is patrolling outside a warehouse or corporate campus, it may be connected to that warehouse or corporate campus' security system. If the environment that the autonomous data machine is monitoring has a pre-existing security system, the autonomous data machine may be communicating with the system. In some instances, information from the autonomous data machine and system may be compiled at a control center.

Use autonomous data machines may provide home alarm system improvement. For instance, a large number of home alarms that go off are false alerts. An autonomous data machine may be used to validate an alarm that has gone off. The machine may use its sensing capabilities to confirm that a home alarm is more valid.

Crowd sourcing of security may occur. For example, a device may be provided for a community to engage, report, and interact through a number of means (e.g., text, video, audio, email, posts) in order to help address criminal activity. The systems and methods described herein may incorporate data gathered through individuals in the environment. For examples individuals may post information online or send information to a control center. In some instances, individuals may utilize mobile devices (e.g., smartphones, tablets) to capture images and/or provide information. Such information may be incorporated with data gathered from autonomous data machines. In some instances, information posted by other individuals may be sent to the autonomous data machines or may affect operation of the autonomous data machines. In some instances, information gathered by machines may be sent to local mobile devices, or the control center may analyze data from the machines in combination with other data and send alerts to local mobile devices.

In one example, the system may be used to detect weapons of mass destruction (WMD). The detection of WMD may occur using an autonomous data machine. A WMD detection module may be an optional payload of the machine. For example one or more chemical sensors, biological sensors, radiation sensors, and/or pathogen sensors may be provided. If a WMD is provided an alert may be provided to the appropriate law enforcement agency and/or private security. In some instances, an audible alarm may not be provided to not raise the suspicions of the party with the WMD and cause the party to set off the alarm. In other implementations, an alarm may be provided to the surrounding individuals to vacate the area as soon as possible. This may be preferable in situations where no humans are found to be holding or controlling the WMD.

In another example, the system may be used for security at a school. For a school pairing implementation, the autonomous data machine may be deployed at a school. It may match a child's face, using a facial recognition program, to a license plate with optical character recognition. The machine may use this information to make sure the correct child is getting into a vehicle, or that a child is departing in the correct vehicle. For example, the children of the school may be pre-registered, along with permitted vehicles. The image sensor of the machine may capture an image of the child and the vehicle and/or license plate. A comparison may be made (e.g., on-board the machine or at a control center) to determine whether the vehicle is a permitted vehicle that is pre-registered for the child. In some embodiments, if it is not a permitted vehicle, the machine may send an alert to the school or a parent of the child. The machine may send a query to the parent of the child or other authorized individual to authorize the vehicle. If the vehicle is authorized, no further action may be taken. If the vehicle is not authorized, further alerts may be provided (e.g., to law enforcement) or audible alarms may be provided. Images of the vehicle and/or drive may be captured and/or communicated.

Figure 6A:
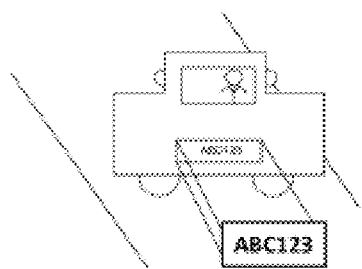
FIG. 6A provides an example of license plate recognition using one or more vision sensor of the autonomous data machines.
Figure 6B:
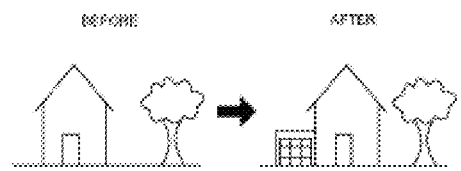
FIG. 6B shows an example of progress mapping at a construction site.
Figure 6C:
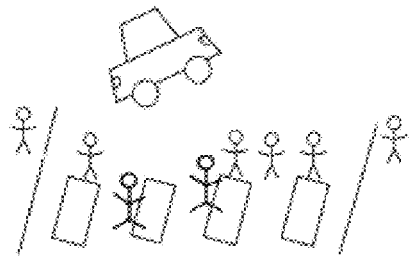
FIG. 6C shows an example of traffic that may be analyzed with aid of an autonomous data machine.
Figure 6D:
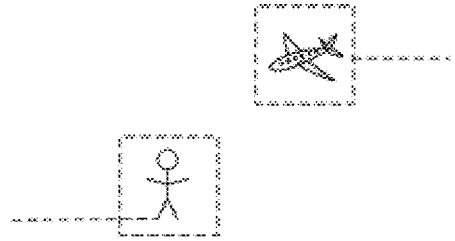
FIG. 6D illustrates how autonomous data machines may be useful for detection and tracking of individual objects.

Autonomous data machines may be useful for detection and tracking of individual objects as shown in FIG. 6D. In some instances, a plurality of autonomous data machines may be distributed over an area. When an object, such as a human being, is being tracked, images collected by the multiple data machines may be compared and analyzed. For example, a suspect may be fleeing the scene of a crime. The image of the suspect may be captured by multiple machines the movement of the suspect may be tracked by where and when the machines capture the image of the suspect. Facial and/or object recognition may be useful to aid in the tracking. In another example, law enforcement may wish to track the movement of an object, such as a suitcase. Even if the suitcase is handed off to different people, object recognition used by the multiple data machines may aid in keeping track of the location of the suitcase.

In some embodiments, the autonomous data machines may be used for greeting and/or guidance. The mission of the autonomous data machines may be to welcome humans to a location and help them with any needs. For example, machines may be deployed at a corporate headquarters, college campus, or museum to aid in directing visitors or providing useful information. The machines may make informative announcements such as time, news, upcoming events, or any information relevant to their location.

In additional implementations, the autonomous data machines may be used to regulate parking. A mission of the autonomous data machine may be to facilitate parking at a parking facility and/or track activity at the parking facility. A security element may also be provided, where the autonomous data machine may have a mission to minimize accidents or crime at the parking facility. One or more autonomous data machines may be deployed at car parking facilities. License plates may be detected. For example, image capture devices of the machines may be used to take snapshots of the license plates. Optical character recognition may permit the machines to 'read' the license plates. Mobile automated license plate recognition may permit the monitoring of license plates utilizing a machine in a certain predetermined range of speed (e.g., about 1 mph-25 mph). FIG. 6A provides an example of license plate recognition using one or more vision sensor of the autonomous data machines. Detection of the license plates may be connected with location and time. Authentication and logging against a database may occur. For example, the information about the license plates may be run against an external data base, such as a motor vehicle association database. Images of the vehicle on which the license plates are mounted may also be collected and/or analyzed to determine whether they match the information in the databases. If a stolen license plate/vehicle is detected the machines may make note and/or update databases or provide alerts.

The machines may also be used to detect free parking spots. Their usage may develop parking use patterns to optimize and predict parking space utilization. In some instances, machines at different locations at a parking structure may communicate with one another about detected parking spaces. This information may be used to direct vehicles to open spots or areas of the parking structure with many more openings. A human machine interface for parking facility operators and users may be provided, such as mobile applications or web sites.

In additional implementations, the machines may be used oversee constructions sites. A mission of a machine may be to oversee progress and safety at the construction sites. FIG. 6B shows an example of progress mapping at a construction site. The autonomous data machines may be capable of detecting before and after conditions. For example, the autonomous data machine may collect an image of a site at a first time. Then the autonomous data machine may collect an image of the site at a second time. The images may be compared to see what changes were made. In some instances, the changes may indicate progress, and may highlight what progress has been established.

Machines may also be used to view and/or analyze traffic. This may include pedestrian traffic, as shown in FIG. 6C, vehicle traffic, air traffic, or any other type of traffic. This information may be provided to a control center and may be useful in various applications.

Autonomous data machines may also be used to detect networks. A machine may detect WiFi and other wireless networks. Network maps may be created and shared by the machine and/or control center. In some instances "rogue networks" may be detected and analyzed with aid of the machine. The roaming nature of the machine may be useful for detecting signals and creating maps of items that may not be readily visually discernible.

Similarly, autonomous data machines may be useful for detecting and localizing cell phones using their specific signature with wireless systems, such as via Bluetooth or WiFi identifier. Telecommunication networks may thus also be detected and/or mapped.

In additional implementations, the autonomous data machines may carry additional user-provided sensors as black box sensors. User provided sensors and data processing may generate specific missions and requests for autonomous data machines that may be fed back to the autonomous data machine with a defined priority. This may permit a user to apply black box applications outside of the system and oversight (e.g., control center system and oversight). The user may specify and design the missions for the machine. For example, the user may be an industry facility, and may create a proprietary identification system in the industry facility.

Autonomous data machines may be capable of performing mixed applications in an environment, such as surveillance, access control, parameter monitoring, identification and tracking of objects and people, identification of damages or other physical changes. In another example, the machines may be capable of a combination of security implementations and parking structure management. In another example, the machines may perform a combination of network mapping as well as crime mapping.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. An autonomous data machine comprising:
   one or more propulsion units configured to permit the autonomous data machine to traverse an environment;
   a power supply configured to provided power to the one or more propulsion units;
   one or more sensors configured to collect data about the environment; and
   a control unit comprising a one or more processors configured to receive and analyze data collected by the one or more sensors and execute program instructions stored in a memory unit to analyze the sensor data and initiate a response based on the analysis of the sensor data by the one or more processors, wherein the response mitigates abuse of the autonomous data machine from a human in the environment, wherein the abuse of the autonomous data machine from a human in the environment comprises an attempt to deactivate the autonomous data machine by the human.

2. The autonomous data machine of claim 1, wherein the power supply is a rechargeable battery.

3. The autonomous data machine of claim 1, wherein the response mitigates abuse the autonomous data machine by the human by producing an audible alarm.

4. The autonomous data machine of claim 1, wherein the response mitigates abuse the autonomous data machine by the human by transmitting an alarm notification to control center.

5. The autonomous data machine of claim 1, wherein the abuse of the autonomous data machine from the human comprises vandalism of the autonomous data machine by the human.

6. The autonomous data machine of claim 1, the abuse of the autonomous data machine from a human is sensed and recorded by one or more vision sensors of the autonomous data machine.

7. The autonomous data machine of claim 1, wherein the data machine further comprises an interface configured to enable communication with the human in the environment.

8. The autonomous data machine of claim 7, wherein the interface comprises a display screen.

9. The autonomous data machine of claim 1, wherein the autonomous data machine is in communication with a control center off-board the autonomous data machine.

10. The autonomous data machine of claim 9, wherein the autonomous data machine transmits at least a fraction of the data collected by the one or more sensors to the control center.

* * * * *